United States Patent
Gilbert et al.

(10) Patent No.: US 11,162,913 B2
(45) Date of Patent: Nov. 2, 2021

(54) ANALYSIS OF ELECTROCHEMICAL IMPEDANCE SPECTRA USING PHASE ANGLE SYMMETRY ACROSS LOG FREQUENCY

(71) Applicant: CLEMSON UNIVERSITY, Clemson, SC (US)

(72) Inventors: Jeremy L. Gilbert, Clemson, SC (US); Piyush Khullar, Clemson, SC (US)

(73) Assignee: Clemson University, Clemson, SC (US)

(*) Notice: Subject to any disclaimer, the term of this patent is extended or adjusted under 35 U.S.C. 154(b) by 13 days.

(21) Appl. No.: 16/823,686

(22) Filed: Mar. 19, 2020

(65) Prior Publication Data

US 2020/0300796 A1 Sep. 24, 2020

Related U.S. Application Data

(60) Provisional application No. 62/821,573, filed on Mar. 21, 2019.

(51) Int. Cl.
*G01N 27/02* (2006.01)

(52) U.S. Cl.
CPC ......... *G01N 27/026* (2013.01); *G01N 27/028* (2013.01)

(58) Field of Classification Search
CPC ............... G01N 33/5438; G01N 27/02; G01N 27/026; G01N 27/028; G01R 31/389
See application file for complete search history.

(56) References Cited

U.S. PATENT DOCUMENTS

| 4,489,141 A | 12/1984 | Stafford et al. |
| 5,198,771 A | 3/1993 | Fidler et al. |

(Continued)

OTHER PUBLICATIONS

ASTM. "Standard Specification for Wrought Cobalt-28Chromium-6Molybdenum Alloys for Surgical Implants (UNS R31537, UNS R31538, and UNS R31539)" *ASTM Int 'l*. F1537-20 (2020) pp. 1-4. (Abstract only).

(Continued)

*Primary Examiner* — Alesa Allgood
(74) *Attorney, Agent, or Firm* — Dority & Manning, P.A.

(57) ABSTRACT

A method is disclosed for analysis of the impedance behavior of electrochemical impedance circuits or the Transfer Function for input-output systems, utilizing the symmetry of the phase angle response with the Log of the frequency to allow for determination of the lower frequency half of the impedance response over Log frequency based only on information from the upper half response. The underlying analytical basis for the symmetry of the phase angle and the methods for applying this analysis are applicable to simple R-C circuits, Randle circuits, Constant Phase Element (CPE)-Randles and coating model circuits. Symmetric functions describing the derivative of the phase angle, θ, with respect to the Log of the frequency can be used to determine the circuit elements requiring only the high frequency information. Only knowledge of the high frequency-based response is needed to know how the low frequency range behaves. Capturing high frequency impedance can be done in a few seconds compared with many hours of experimental effort to obtain low frequency behavior, to allow for continuous monitoring of polarization resistance with only a few seconds of data capture required. The method is applicable to numerous sensor applications across a range of disciplines including corrosion focused industries, battery technology and bioelectrochemical fields, and applicable to (Continued)

other Transfer Function analyses that include such as dielectric relaxation and complex modulus.

23 Claims, 18 Drawing Sheets

(56) References Cited

U.S. PATENT DOCUMENTS

| | | | | |
|---|---|---|---|---|
| 5,370,776 | A | * | 12/1994 | Chen ............... G01N 17/02 204/404 |
| 5,425,867 | A | * | 6/1995 | Dawson ............ G01N 17/02 204/400 |
| 5,466,356 | A | | 11/1995 | Schneider et al. |
| 6,885,960 | B2 | | 4/2005 | Wagner et al. |
| 7,015,701 | B2 | | 3/2006 | Wiegand et al. |
| 7,239,155 | B2 | | 7/2007 | Byington et al. |
| 7,581,434 | B1 | * | 9/2009 | Discenzo ......... G01N 33/2888 73/53.01 |
| 7,877,009 | B2 | | 1/2011 | Wang et al. |
| 9,861,746 | B2 | | 1/2018 | Gautham et al. |
| 2009/0027070 | A1 | | 1/2009 | Gelling |
| 2016/0299093 | A1 | * | 10/2016 | Gilbert ............. G01N 27/026 |
| 2017/0254859 | A1 | | 9/2017 | Christophersen et al. |

OTHER PUBLICATIONS

Barsoukov, et al. (Eds.) "Impedance Spectroscopy: Theory, Experiment, and Applications" *John Wiley & Sons, Inc.* 2nd Ed. (2005) pp. 1-606.

Boukamp, B. A. "A linear Kronig-Kramers transform test for immittance data validation" *J. Electrochem. Soc.* 142 (1995) pp. 1885-1894.

Boukamp, B.A. "A package for impedance/admittance data analysis" *Sol. State Ion.* 18-19 (1986) pp. 136-140.

Boukamp, B.A. "A nonlinear least squares fit procedure for analysis of immittance data of electrochemical systems" *Sol. State Ion.* 20 (1986) pp. 31-44.

Ehrensberger, et al. "The effect of static applied potential on the 24-hour impedance behavior of commercially pure titanium in simulated biological conditions" *J. Biomed. Mater. Res. B Appl. Biomater.* 93B (2010) pp. 106-112.

Gamry. "Echem Analyst™ Software Operator's Guide" *Gamry Instruments, Inc.* 988-00016 (2019) pp. 1-46.

Haeri, et al. "The voltage-dependent electrochemical impedance spectroscopy of CoCrMo medical alloy using time-domain techniques: Generalized Cauchy-Lorentz, and KWW-Randles functions describing non-ideal interfacial behaviour" *Corr. Sci.* 53 (2011) pp. 582-588.

Harrison, et al. "Characterization of Perfluoro sulfonic Acid Polymer Coated Enzyme Electrodes and a Miniaturized Integrated Potentiostat for Glucose Analysis in Whole Blood" *Anal. Chem.* 60 (1988) pp. 2002-2007.

He, et al. "A Graphical Approach for Human Skin Moisture Evaluation by Electrical Impedance Spectroscopy" *Appl. Mech. Mater.* 336-338 (2013) pp. 319-326.

Huang, et al. "Graphical analysis of electrochemical impedance spectroscopy data in Bode and Nyquist representations" *J. Power Sources* 309 (2016) pp. 82-98.

Lemaitre, et al. "The estimation of the charge transfer resistance by graphical analysis of inclined semicircular complex impedance diagrams" *J. Appl. Electrochem.* 13 (1983) pp. 803-806.

Levenberg, K. "A method for the solution of certain non-linear problems in least squares" *Quart. Appl. Math.* 2 (1944) pp. 164-168.

Lin, J. "An Electrochemical Method to Evaluate Localized Corrosion in Retrieved Modular Tapered Orthopedic Implants" *Syracuse U.* (2016), (Abstract only).

Liu, et al. "The effect of simulated inflammatory conditions and Fenton chemistry on the electrochemistry of CoCrMo alloy" *J. Biomed. Mater. Res. B Appl. Biomater.* 106 (2018) pp. 209-220.

Liu, Y. "The effects of simulated inflammatory conditions on the corrosion and fretting corrosion of CoCrMo alloy" *Syracuse U.* (2017) pp. 1-218.

Liu, et al. "The effect of simulated inflammatory conditions and pH on fretting corrosion of CoCrMo alloy surfaces" *Wear* 390-391 (2017) pp. 302-311.

MacDonald, J.R. "Impedance spectroscopy: Models, data fitting, and analysis" *Sol. State Ion.* 176 (2005) pp. 1961-1969.

MacDonald, et al. "A flexible procedure for analyzing impedance spectroscopy results: Description and illustrations" *Sol. State Ion.* 24 (1987) pp. 61-79.

MacDonald, et al. "Analysis of impedance and admittance data for solids and liquids" *J. Electrochem. Soc.* 124 (1977) pp. 1022-1030.

Marquardt, D.W. "An algorithm for least-squares estimation of nonlinear parameters" *J. Soc. Ind. Appl. Math.* 11 (1963) pp. 431-441.

Meloni, G.N. "Building a Microcontroller Based Potentiostat: A Inexpensive and Versatile Platform for Teaching Electrochemistiy and Instrumentation" *J. Chem. Educ.* 93 (2016) pp. 1320-1322.

Orazem, et al. (Eds.) "Electrochemical Impedance Spectroscopy" *John Wiley & Sons, Inc.* 2nd Ed. (2008) pp. 1-532.

Orazem, et al. "Enhanced graphical representation of electrochemical impedance data" *J. Electrochem. Soc.* 153 (2006) pp. B129-B136.

Ramos, et al. "Low Frequency Impedance Measurement using Sine-Fitting" *Measurement* 35 (2004) pp. 89-96.

Rosen, et al. "Free radicals and phagocytic cells" *FASEB J.* 9 (1995) pp. 200-209.

Ruiz-Morales, et al. "Application of an alternative representation to identify models to fit impedance spectra" *Sol. State Ion.* 176 (2005) pp. 2011-2022.

Ruiz-Morales, et al. "A new alternative representation of impedance data using the derivative of the tangent of the phase angle: Application to the YSZ system and composites" *Mater. Res. Bull.* 39 (2004) pp. 1299-1318.

Saxman, D. "Electrical Power Storage: Technologies for Alternative Energy Sources" *BCC Research* EGY073B (2017) pp. 1-391.

Schwake, et al. "Application of a new graphical fitting approach for data analysis in electrochemical impedance spectroscopy" *Electroanalysis* 10 (1998) pp. 1026-1029.

Tiitta, et al. "Electrical impedance spectroscopy device for measurement of moisture gradients in wood" *Rev. Sci. Instru.* 73 (2002) pp. 3093-3100.

York. B. "Frequency Response and Bode Plots" *NJ Inst. Techn.* (2009) pp. 1-20.

Žic, M. "An alternative approach to solve complex nonlinear least-squares problems" *J. Electroanal. Chem.* 760 (2016) pp. 85-96.

Zoltowski, P. "Non-traditional approach to measurement models for analysis of impedance spectra" *Sol. State Ion.* 176 (2005) pp. 1979-1986.

ISA. "International Search Report and Written Opinion" *Int'l Search. Auth.* PCT/US2020/023591 (Jun. 17, 2020) pp. 1-12.

* cited by examiner

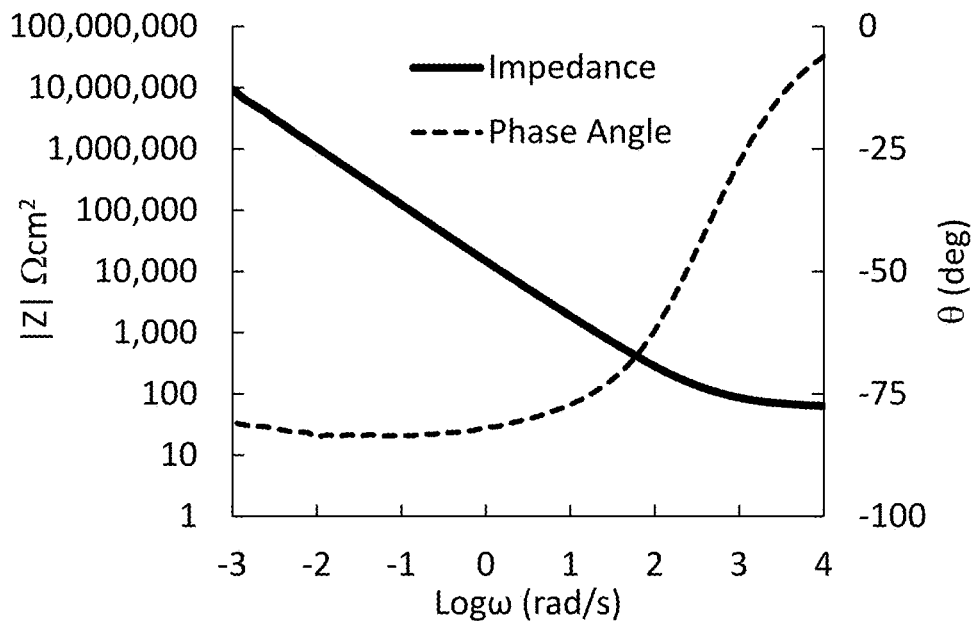
FIG. 1
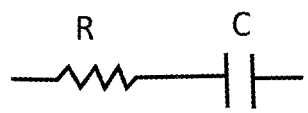
FIG. 2A
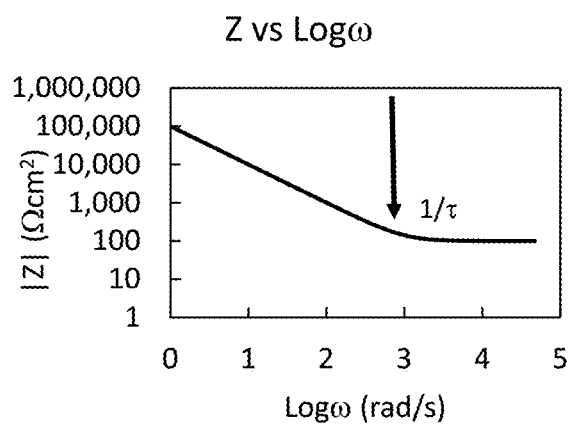 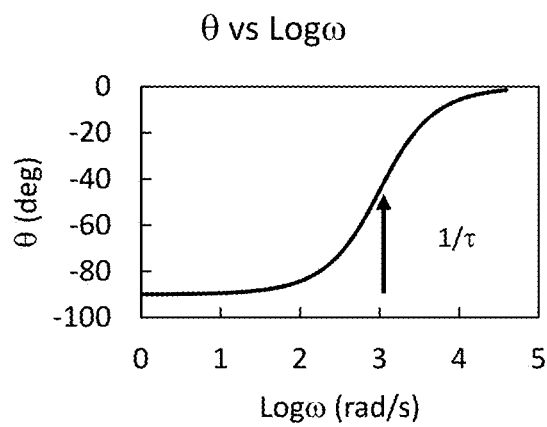
FIG. 2B     FIG. 2C

FIG. 4A     FIG. 4B

ANALYSIS OF ELECTROCHEMICAL IMPEDANCE SPECTRA USING PHASE ANGLE SYMMETRY ACROSS LOG FREQUENCY

PRIORITY CLAIM

The present application claims the benefit of priority of U.S. Provisional Patent Application No. 62/821,573, titled A Method To Determine The Low Frequency Electrode Impedance Response From The High Frequency Impedance Only: Phase Symmetry Across Log Frequency, and filed Mar. 21, 2019, which is incorporated herein by reference for all purposes.

GOVERNMENT SUPPORT CLAUSE

This presently disclosed subject matter was made without government support.

FIELD

The present disclosure relates generally to subject matter concerning detection and determination of impedance characteristics for circuits and electrode interfaces. More particularly, the present subject matter relates to analysis of impedance behavior of electrochemical impedance circuits (or the Transfer Function for input-output systems) utilizing the symmetry of the subject circuit phase angle response with the Log of the frequency to allow for determination of the lower frequency half of the impedance response over Log frequency based only on information from the upper half response.

BACKGROUND

Typical software used to determine the parameters of electrochemical impedance spectra (EIS) circuits and/or for electrode interfaces relies on a "complex non-linear least squares fitting algorithm" (CNLS) to find the circuit elements. These fitting approaches rely on a functional optimization approach (least squares fitting) to fit the captured data with a function (or set of functions) with the least error between the function and the data, with little knowledge or understanding of the underlying processes giving rise to the variations or the properties of the functions being fitted. There are often limitations in the acquired data, particularly in the low frequency regime, where such fitting approaches are not able to accurately determine the circuit parameters describing the impedance behavior of the electrode.

Existing EIS analysis methods, in order to directly measure the polarization resistance of an electrode, require capturing the system response to very low frequencies. Such can be typically 0.001 Hz or less. This measurement requires hours to perform.

As such, there is a need for the development of improved, high performance detection systems, featuring improved speed and sensitivity on determining relatively lower frequency range analysis of subject circuits.

SUMMARY

Aspects and advantages of embodiments of the present disclosure will be set forth in part in the following description, or may be learned from the description, or may be learned through practice of the embodiments.

In general, it is a present objective to provide improved, high performance detection systems, featuring improved speed and sensitivity on determining relatively lower frequency range analysis of subject circuits and/or electrode interfaces.

It is a more particular objective, in some instances, to provide an improved design and methodology approach which allows for determination of the low frequency response of the impedance based only on knowledge of the high frequency portion of the determined response.

In particular, for some presently disclosed exemplary embodiments, the polarization resistance of an electrode surface can be determined using only the high frequency half of the EIS spectra. This approach relies on the concept that symmetry relationships in the EIS information across the log frequency range can be exploited.

This presently disclosed method of Electrochemical Impedance Spectroscopy (EIS) analysis has broad applicability in any field where corrosion monitoring or measurement of the impedance behavior of an electrode is important for inspection of corrosion susceptibility or damage. The principal advantage of this approach is that the time required to capture the impedance behavior is dramatically shortened since the low frequency response can be predicted from only the high frequency (typically above 1 Hz) behavior. This proposed method can shorten prior system times in some instances to less than 1 minute, and in some cases, to just a few seconds.

A new method for analysis of the impedance behavior of electrochemical impedance circuits (or, in general, the Transfer Function for input-output systems) has been developed which utilizes the symmetry of the phase angle response and its derivative with the Log of the frequency to determine the value of the equivalent circuit elements. In addition, because of this symmetry, the lower frequency half of the impedance response over Log frequency can be calculated based only on information from the upper-half frequency response. The underlying analytical basis for the symmetry of the phase angle and the methods for applying this analysis are presented. Analysis of simple R-C circuits, Randle circuits and Constant Phase Element (CPE)-Randles are presented to derive the symmetric functions for these commonly used circuits. Experimental Electrochemical Impedance Spectroscopy (EIS) data focused on cobalt-chromium-molybdenum (CoCrMo) alloy performance in physiologically representative solutions were collected, analyzed using the described method, and compared to standard non-linear least squares fitting. Excellent correlation between the analytical equations and experimental data was obtained. A substantial advantage of this approach is that it only requires knowledge of the high frequency-based response to predict the behavior in the low frequency range. Thus, determining the low frequency behavior requires capturing the high frequency impedance in a few seconds rather than in what had, until now, required up to many hours of experimental effort to obtain. Although the mathematical approach presented here is focused on corrosion parameters, it is applicable to other Transfer Function analyses that include dielectric relaxation, complex modulus and others.

The potential application of the presently disclosed method includes in any field where corrosion or impedance testing is important, including the energy industry, battery industry, medical field, transportation (air, train, car, truck, ship), etc. In addition, alternative Transfer Function systems (e.g., Complex Modulus, Dielectric Relaxation, etc.) can similarly be evaluated using these approaches.

The basic approach used in some exemplary embodiments of this presently disclosed subject matter is a novel analysis of the phase angle and Log of the impedance magnitude behavior with Log of the frequency of such circuits as a tool to find the low frequency (e.g., polarization resistance) behavior from only the high frequency response.

This approach, for some exemplary embodiments, relies on the properties of ideal and non-ideal RC circuits and the combination of the Log Z and phase angle versus Log $\omega$ behavior to allow for determination of the parameters of the circuit. In particular, there is symmetry in the phase angle ($\theta$) vs log $\omega$ response that is exploited in this analysis. As a result, the experimental data does not require the entire frequency range (especially in the low frequency region) to determine the behavior, yet the symmetry properties will allow for determination of the low frequency response (i.e., Rp).

While the principles outlined here apply to electrode systems that respond as RC, R-CPE (constant phase element) or CPE-Randles circuit systems, more complex, so-called "coated model" electrode systems can also be analyzed using this approach. Examples of the use of this approach with real experimental data will be shown, and the limits of this approach and the applicability to other circuit element models will be discussed.

The method developed here was designed principally for use in the study of medical alloys and for metallic implants comprised of these alloys and could be incorporated into, for example, electrochemically-based sensors where impedance measurements are important to the performance or monitoring of metallic implant performance. It is likely that another useful application of the presently disclosed method is in the area of EIS sensors.

One exemplary embodiment of presently disclosed subject matter relates in pertinent part to a presently disclosed method for analysis of the impedance behavior of electrochemical impedance circuits (or the Transfer Function for input-output systems). Such exemplary method utilizes the symmetry of the phase angle response with the Log of the frequency to allow for determination of the lower frequency half of the impedance response over Log frequency based only on information from the upper half response. The underlying analytical basis for the symmetry of the phase angle and the methods for applying this analysis are discussed herein. As examples, analysis of simple R-C circuits, Randle circuits, Constant Phase Element (CPE)-Randles and coating model circuits are presented.

It is discussed herein that for some presently disclosed exemplary embodiments, symmetric functions describing the derivative of the phase angle, $\theta$, with respect to the Log of the frequency can be used to determine the circuit elements and that only the high frequency information is required. These symmetric functions are derived for ideal and CPE based circuit models.

Per some presently disclosed exemplary embodiments, experimental Electrochemical Impedance Spectroscopy (EIS) data focused on CoCrMo alloy performance are analyzed using the approach described. Other alloys may also be practiced, such as for Ti alloy, stainless steel alloy, or magnesium alloy electrodes, and/or other biomedical alloys now known or later developed. A substantial advantage of this approach is that it only requires knowledge of the high frequency-based response to know how the low frequency range behaves. Thus, determining the low frequency behavior requires capturing the high frequency impedance in a few seconds rather than in what had, until now, required up to many hours of experimental effort to obtain.

Examples of how the presently disclosed method can be applied in other exemplary embodiments to non-ideal conditions (CPE-Randles and coated model systems) are also explained and demonstrated. This approach may allow for continuous monitoring of polarization resistance with only a few seconds of data capture required and opens the possibility of numerous sensor applications across a range of disciplines including corrosion focused industries, battery technology and bioelectrochemical fields. In addition, the approach described is applicable to other Transfer Function analyses that include dielectric relaxation, complex modulus and others.

The presently disclosed method of analysis of electrochemical Impedance data can significantly reduce the time and data capture needed to determine the complete frequency-dependent electrochemical impedance response of an electrode. Exemplary embodiments of the presently disclosed method address the problem of the inability or lengthy time required to capture the low frequency impedance response of an electrode system. The most critical impedance element of an electrode typically involves the low frequency response when the electrode polarization resistance is determined. Depending on the electrode and electrolyte, low frequency impedance measurements may take hours to days to complete which limits the utility of impedance monitoring of corroding or electrochemically active systems.

In contradistinction, the presently disclosed subject matter can determine the low frequency impedance response of an electrode with knowledge only of the high frequency impedance behavior (with certain limits defining "low" and "high").

The presently disclosed method uses heuristic knowledge of the impedance response of the electrode and circuit models to take the high frequency impedance and determine the low frequency impedance response. This approach can be applied to simple and complex impedance conditions and can dramatically shorten the time required to obtain the complete frequency response from hours or days to minutes or less. This shortened time to obtain the complete impedance response will allow a wide range of industries concerned with corrosion processes (medical, electric power, battery, transportation (auto, air, train, ship), etc.) to monitor the entire impedance behavior and corrosion response in near real time and will shorten the time needed to capture impedance data.

It also provides researchers and experimentalists with an ability to extend the range of frequencies that can be assessed for impedance measurement beyond those measurable. The approach relies on the fact that the electrode impedance over a range of frequencies results in symmetric and anti-symmetric behavior of the phase angle and the impedance magnitude such that once the high frequency response is known up to the mirror frequency, the low frequency response can be determined from the high frequency measurement.

The presently disclosed method provides a mathematical and graphical approach for determining the low-frequency electrode response from the high frequency (to the mirror frequency) impedance measurements.

The primary development relies on new understanding of basic electrode equivalent circuit models. The presently disclosed analysis method for such models and impedance systems is an important component of the presently disclosed subject matter. In addition, more complex electrode Impedance behavior can be analyzed with similar tools to discern the full frequency behavior from only a portion of the response.

Sensors based on the presently disclosed subject matter can be envisioned where the sensor programming incorporates this short-time analysis method.

The presently disclosed method may also have application in other fields including dynamic mechanical analysis of polymeric systems where frequency-dependent complex moduli may be determined from only a portion of the frequency domain response.

The presently disclosed subject matter addresses the technology problem of capturing the low-frequency impedance response of electrodes without having to capture the entire frequency range of impedance. It reduces the time to determine the full frequency impedance from hours or days to minutes or seconds. It also extends the frequency range that can be determined beyond that directly measured during an electrode impedance measurement. This approach allows for the development of sensors and sensor technology that could use impedance measurements for corrosion control and monitoring where only seconds or minutes are needed for a full determination of the impedance response. This means that impedance measurements can be adopted into real-time monitoring of corrosion processes, battery behavior, or other electrode reactions.

Therefore, the presently disclosed subject matter provides a platform for technological innovation that opens up a range of corrosion measurement and monitoring technologies that are not currently available due to the long time required with current technology to capture the full frequency response.

The presently disclosed subject matter in some exemplary embodiments thereof uses knowledge of equivalent circuit elements and responses for electrode systems and a mathematical and graphical approach to extend the range of frequencies over which the impedance can be determined beyond the range captured. It does this utilizing the symmetry of the impedance response across frequency along with other knowledge of the Impedance response which allows the high frequency impedance to determine the low frequency behavior. In doing so, it uniquely exploits the properties of frequency-based impedance response of electrode circuits to extend the frequency range over which the impedance can be determined to well beyond that which is captured by the sensor. In particular, the low frequency impedance response can be obtained from the high frequency response thereby dramatically shortening the time needed to capture the impedance.

In some presently disclosed exemplary embodiments, the approach uses analysis of Bode Diagrams of phase and |Z|, amongst others (loss admittance vs Log frequency, Tangent of the phase angle versus log of frequency, etc.), and the symmetry properties of these frequency-dependent properties to extend to frequency range over which the impedance can be determined.

Some existing technologies for impedance analysis utilize so-called non-linear least squares fitting of functions to data sets to obtained impedance parameters. This curve fitting approach requires data across the range of frequencies in order to fit the functions. Such existing approach does not take into account the symmetry properties of such circuit models and parameters, and therefore, is limited in its ability to accurately determine electrode properties.

In addition, exploitation of the symmetry properties of general Transfer Functions (Output-input functions of a system over a frequency range, including complex modulus, dielectric relaxation, complex viscosity, etc.) can be performed with the presently disclosed approach, again extending the frequency range of analysis.

Currently, use of impedance analysis methods is distributed across a wide range of industries where corrosion (energy, transportation, infrastructure, medical) or battery or other electrode/corrosion behaviors are relevant. The methods presently disclosed here can be adapted into any of these industries in conjunction with sensors and electronic control and analysis methods.

In addition, corrosion testing using electrochemical impedance spectroscopy methods see wide use in the scientific and medical industries. Companies that manufacture the equipment and systems for impedance measurement and analysis would benefit from this advanced modeling and analysis methods presently disclosed herewith, which provide significant advantages. For example, the presently disclosed methods shorten the time needed for impedance analysis to make it feasible to undertake real-time measurement of impedance of electrode systems. It also extends the range of frequencies over which the impedance can be determined beyond the range measured.

Presently disclosed methods of impedance analysis can span use in a range of industries. Basically, any industry where electrode behavior is important may be affected by presently disclosed methods. These may include but are not limited to infrastructure (roads, bridges, railroads), transportation (automotive, air, train, ship), medical (pacemakers, electrical stimulators, metallic implant sensors), energy systems (transmission, batteries), and scientific (corrosion testing, electrochemical monitoring, etc.). It may also be of interest to sensor companies that develop sensors for monitoring corrosion processes or electrochemical processes. More specifically, such companies could include those in the medical device industry, electrochemical test system companies, energy companies, and battery companies.

One presently disclosed exemplary embodiment relates in pertinent part to a method for determining frequency-dependent electrode impedance response from Electrochemical Impedance Spectroscopy (EIS) data, comprising: obtaining electrochemical impedance spectroscopy data for expected upper frequency data ranges associated with an electrode, with such data including both phase angle and impedance data; determining the Log of the frequency data; plotting the phase angle data versus the Log of the frequency data; determining a cross over point frequency for the plotted data; and producing a mirror symmetrical plot of data below the cross over point frequency to mirror the plotted data above the cross over point frequency, whereby a complete frequency-dependent response profile from low frequency to high frequency is obtained based on only upper frequency data.

Another presently disclosed exemplary embodiment relates in pertinent part to a method for detection and determination of impedance characteristics for circuits, comprising obtaining impedance and phase angle frequency data for a subject an electrochemical impedance circuit to be analyzed; plotting the derivative of the phase angle data with respect to the Log of the frequency; determining a cross over point frequency $\omega_x$; determining a full frequency range response plot using a symmetrical mirror of upper frequency data below the cross over point frequency, such that only upper frequency data is needed to determine full frequency range plotting; and using determined response plot data to determine circuit elements of a selected model circuit for the subject electrochemical impedance circuit being analyzed.

Another exemplary embodiment of presently disclosed subject matter relates to a method for determining frequency-dependent electrode impedance response from Electrochemical Impedance Spectroscopy (EIS) data. Such exemplary methodology preferably comprises obtaining electrochemical impedance spectroscopy data for expected upper frequency data ranges associated with an electrode, with said data including both phase angle and impedance data; determining the highest frequency impedance; determining the derivative of the phase angle with respect to the log of the frequency (phase derivative) over the range of frequencies obtained; determining as the high frequency characteristic frequency ($\omega_1$) the frequency (1) where the phase derivative is a maximum, or (2) where there is a maximum in the loss admittance; determining the amplitude of the phase derivative at the maximum frequency $\omega_1$; determining the frequency where the phase derivative crosses zero ($\omega_x$) or determining the frequency where the tangent of the phase angle is a maximum; finding the low frequency characteristic frequency ($\omega_2$) from the high frequency and cross over frequencies; determining all of the circuit parameters from the above values; and producing a mirror symmetrical plot of data below the cross over point frequency to mirror the plotted data above the cross over point frequency, whereby a more complete extended frequency-dependent response profile from low frequency to high frequency is obtained based on only upper frequency data.

It is to be understood from the complete disclosure herewith that the presently disclosed subject matter equally relates to both systems as well as corresponding and/or associated methodologies. One such system relates in pertinent part to a system for determining frequency-dependent electrode impedance response of an electrode, comprising a sensor for obtaining Electrochemical Impedance Spectroscopy (EIS) data for expected upper frequency data ranges associated with an electrode, with such data including both phase angle and impedance data; memory for storing said EIS data; and a processor, operatively associated with such memory for: determining the Log of said EIS data; plotting the phase angle data versus the Log of such EIS data; determining a cross over point frequency for the plotted data; and producing a mirror symmetrical plot of data below the cross over point frequency to mirror the plotted data above the cross over point frequency, whereby a complete frequency-dependent response profile from low frequency to high frequency is obtained based on only upper frequency data.

It is to be understood from the complete disclosure herewith that the presently disclosed symmetry-based electrochemical impedance spectroscopy methods are for analysis of impedance behavior, and in some instances predicts or calculates low frequency response with only high frequency data. At the same time, the presently disclosed subject matter is equally applicable to other transfer function analyses such as dielectric relaxation or complex modulus or others. With such presently disclosed approach, required time capture impedance response is reduced, and the range of frequency that can be analyzed is extended beyond that captured.

Some presently disclosed embodiments determine low frequency response from the high frequency information and can significantly shorten acquisition time in order to allow for near-continuous monitoring of low frequency parameters at short time intervals. The presently disclosed subject matter is also applicable for more defected models too, in order with some embodiments to identify multiple processes. The subject impedance response has wide applicability to multiple technical fields, and the potential to integrate with industry-specific sensors in order to provide near continuous monitoring of low frequency impedance conditions. For example, the subject presently disclosed technology may be applicable to impedance based biomedical sensors/smart implants, or for use in corrosion monitoring applicable to fields like automotive, aerospace, naval, or for battery technology and monitoring. For some embodiments, software solutions may be integrated into sensor technology. The technology can have the ability to use currently existing low powered wireless sensors to perform for example remote real time corrosion monitoring.

Further, the presently disclosed technology can allow for expanding EIS capabilities into applications and fields where relatively longer measurement times have previously proven to be a barrier to adoption.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the FIGs. or stated in the detailed description of such FIGs.). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

A full and enabling disclosure of the presently disclosed subject matter, including the best mode thereof, directed to one of ordinary skill in the art, is set forth in the specification, which makes reference to the appended Figures, in which:

FIG. 1 comprises a Bode plot showing impedance and phase angle measured for a retrieved CoCrMo femoral head immersed in phosphate buffered saline solution. CNLS was unable to determine $R_p$, returning $R_p=10^{13}$ $\Omega cm^2$;

FIG. 2A represents a schematic of an exemplary simplest R-C circuit (resistor in parallel with a capacitor) subject matter;

FIGS. 2B and 2C represent respective impedance and phase response Bode Plots of the exemplary simple R-C circuit of present FIG. 2A, relative to frequency, where $R=100\Omega$, and $C=10^{-5}$ F;

FIGS. 4A-4C respectively illustrate plots showing variation in $|Z|$ (FIG. 4A), $\theta$(FIG. 4B), and $d\theta/d$ Log $\omega$ (FIG. 4C), each across Log $\omega$ between ideal and R-CPE circuits where the exponent, $\alpha$, is 0.8 for the R-CPE model; and the height of the phase derivative peaks (c) is defined by $\alpha$ (Eqs. 12-14), and the characteristic frequency is characterized by Eq. 11;

Figure 4C:
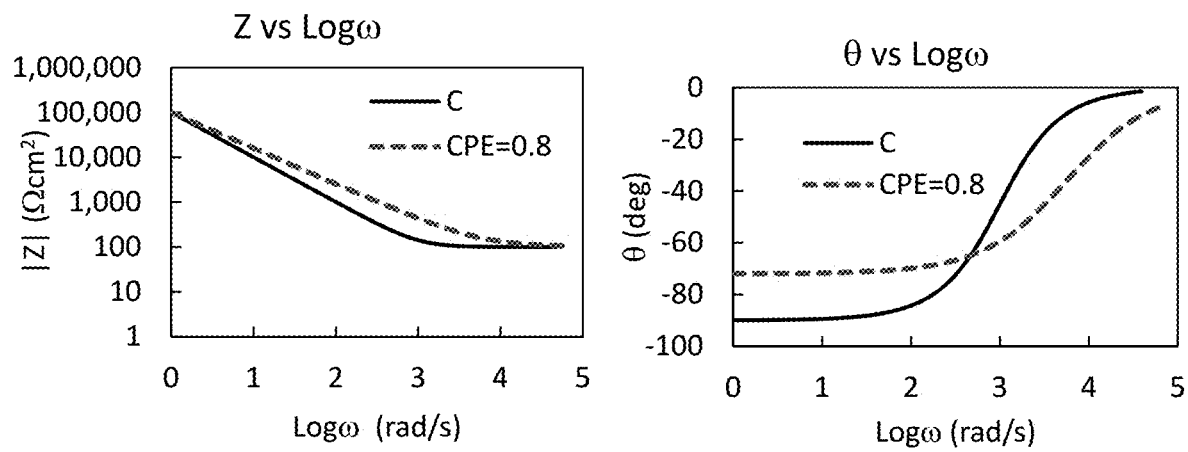
Figure 4C:
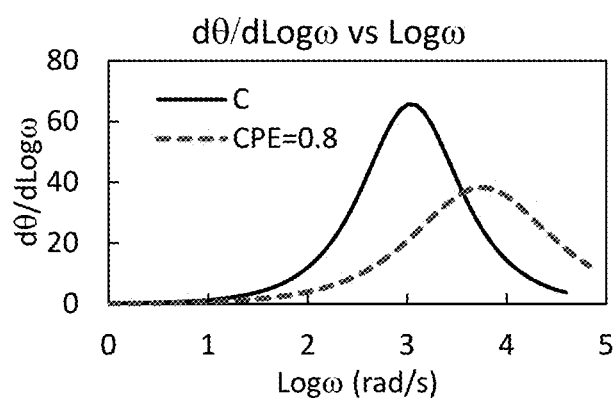
Figure 7A:
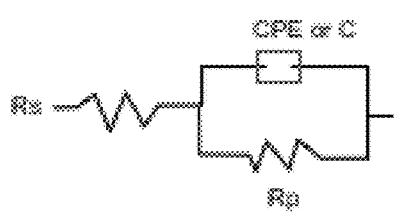
FIG. 7A is a schematic of exemplary Constant Phase Element (CPE) Randle's circuit subject matter.
Figure 7B:
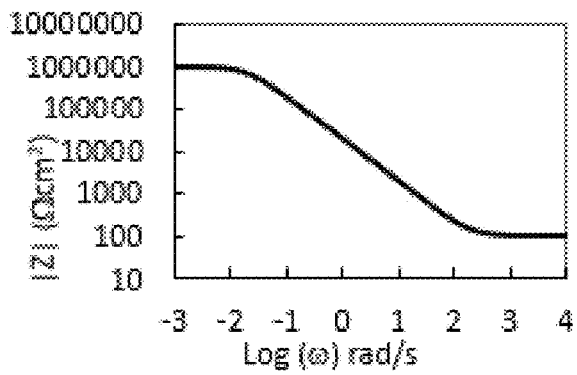
Figure 7C:
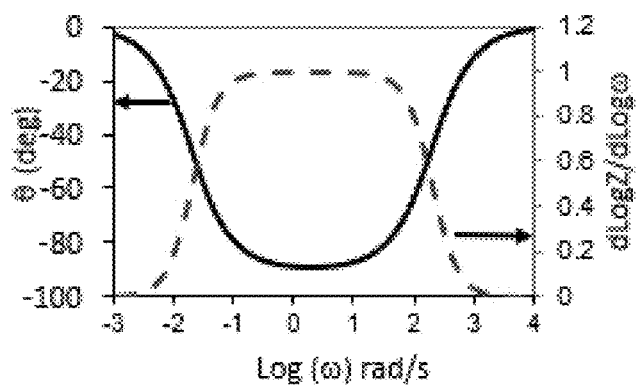
Figure 7D:
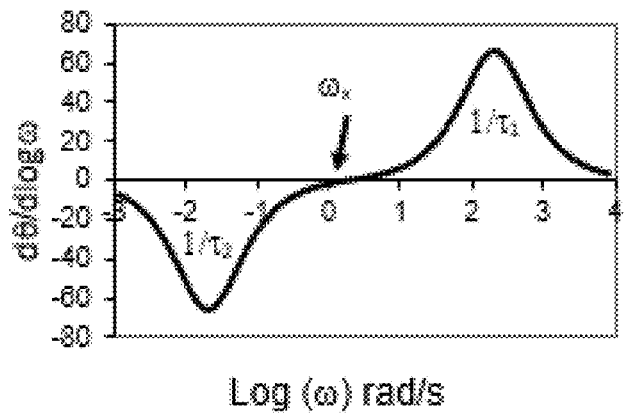
Figure 9A:
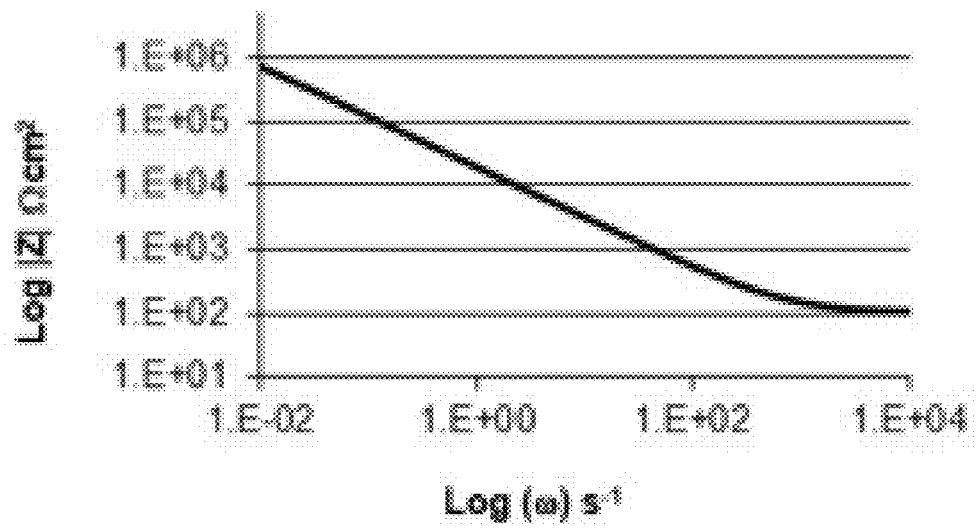
Figure 9B:
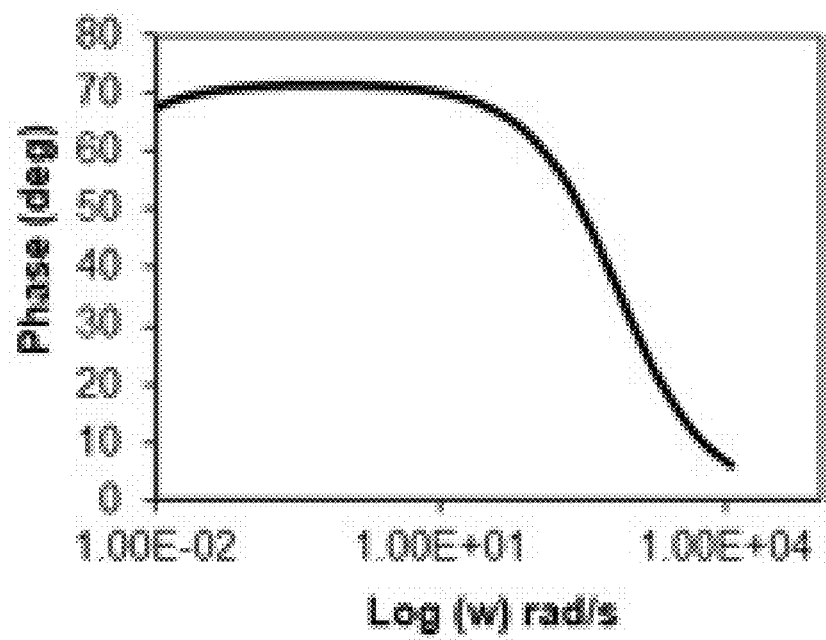
Figure 10A:
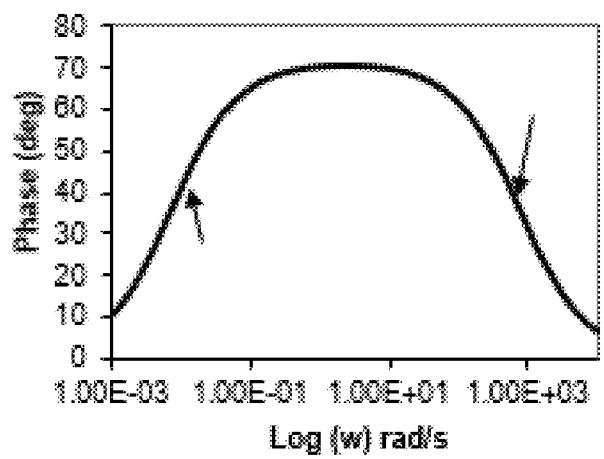
Figure 10B:
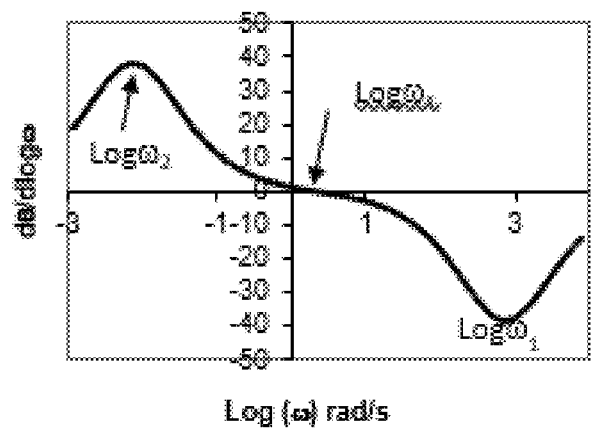
Figure 10C:
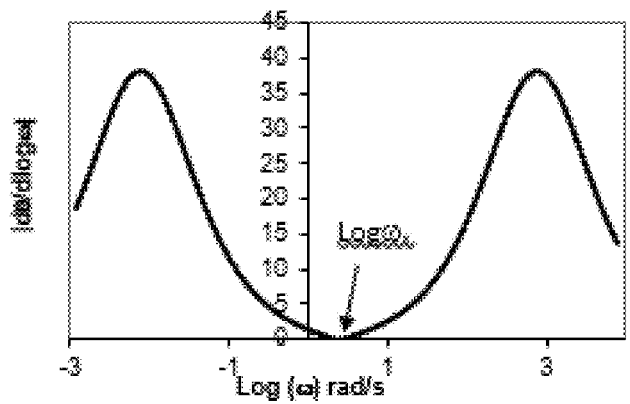
Figure 11:
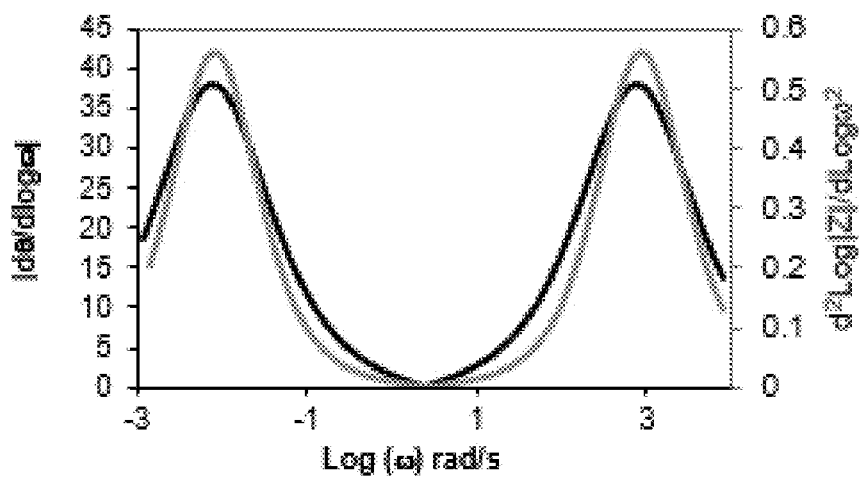
Figure 12:
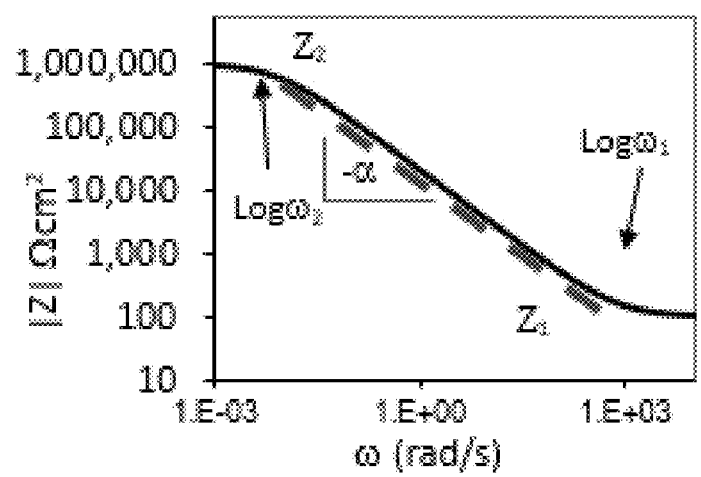
Figure 13A:
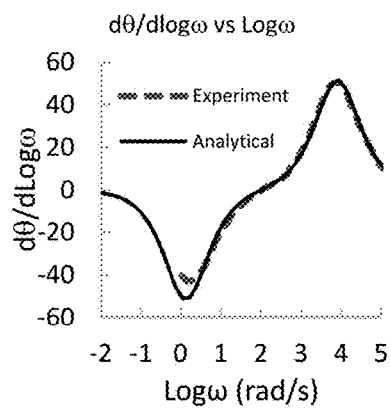
Figure 13B:
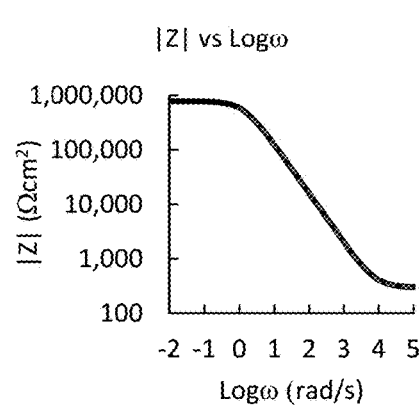
Figure 13C:
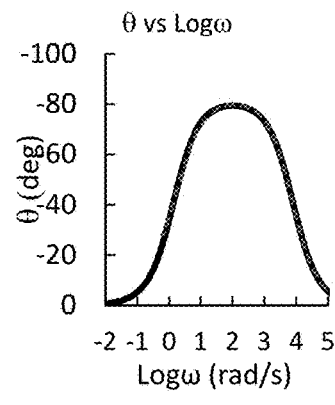
Figure 13D:
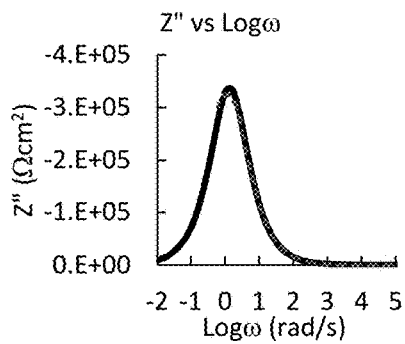
Figure 13E:
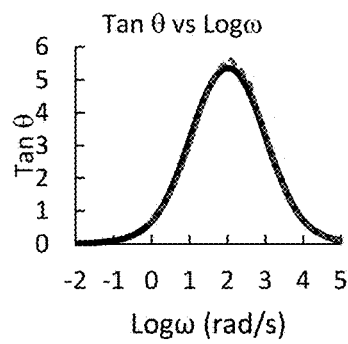
Figure 13F:
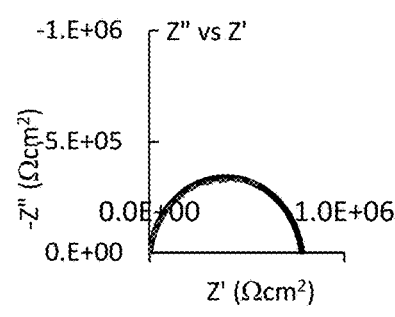
Figure 15A:
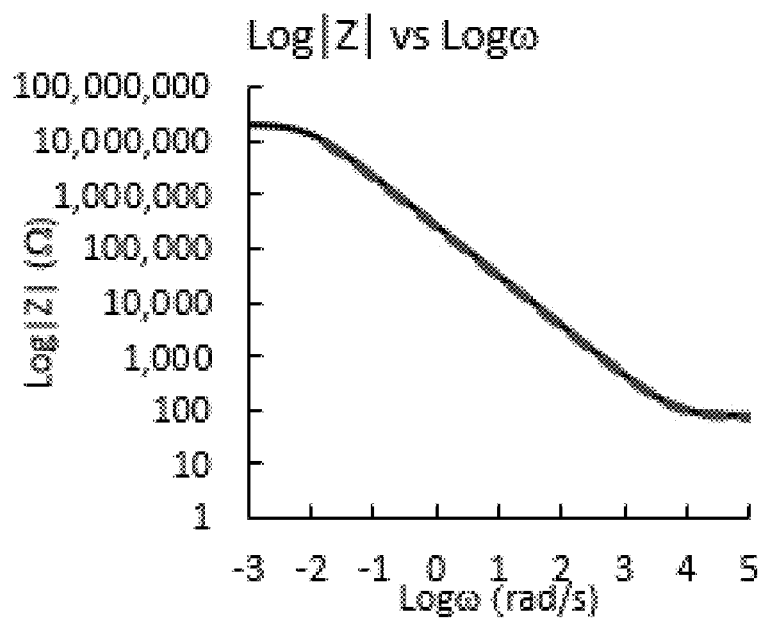
Figure 15B:
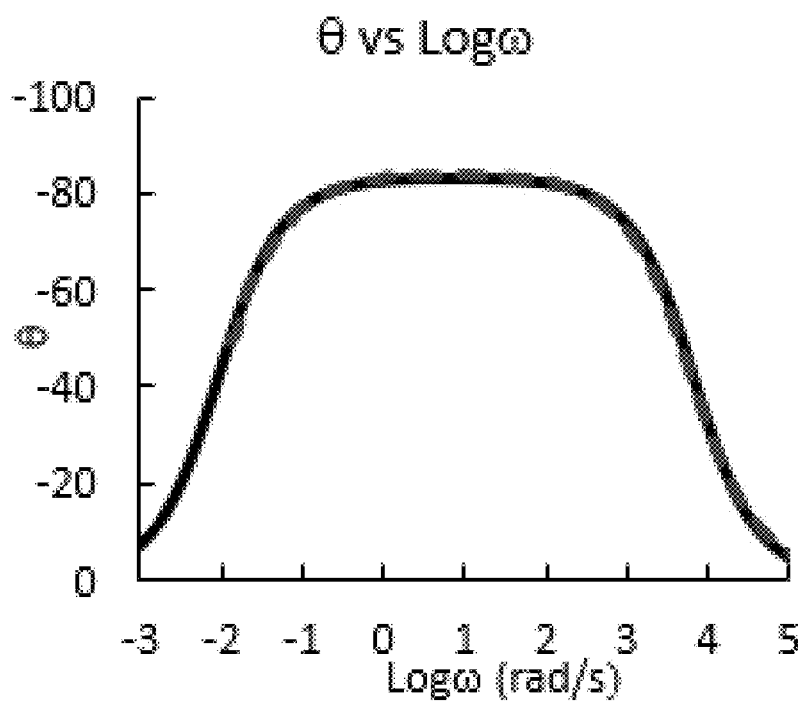
Figure 16A:
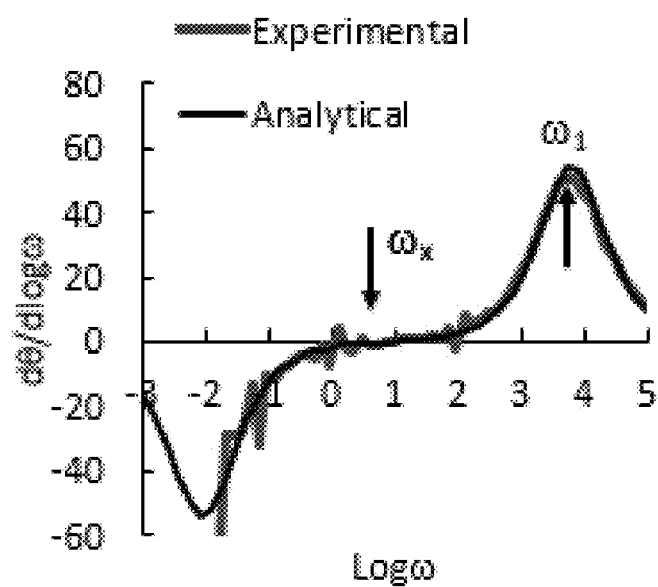
Figure 16B:
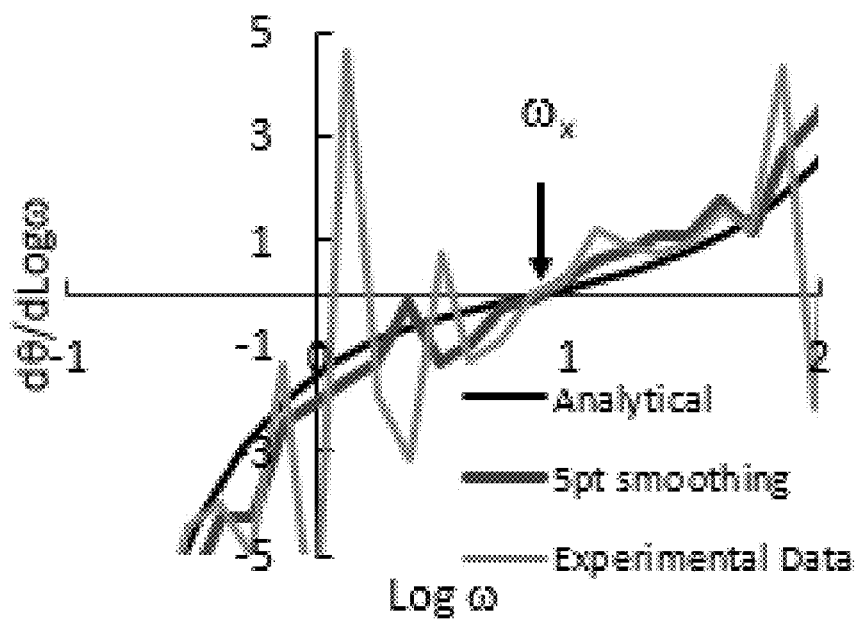
Figure 17:
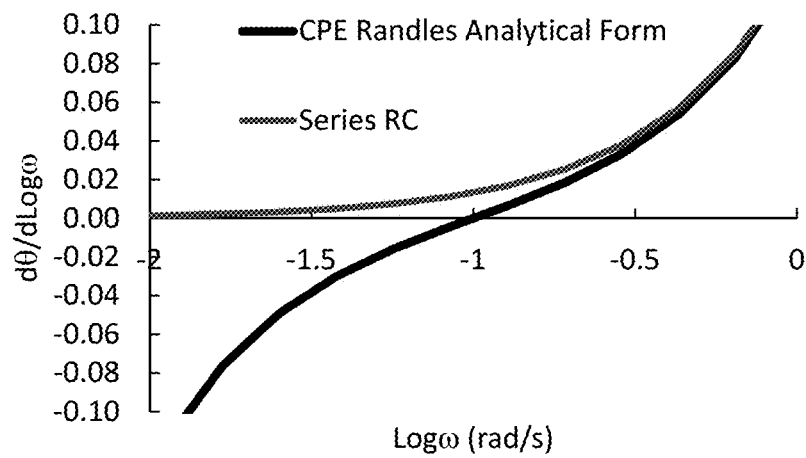
Figure 18:
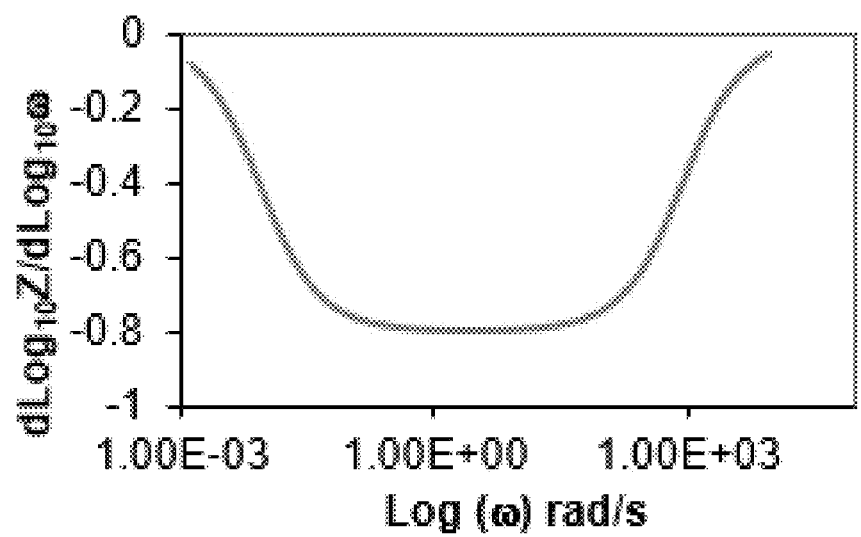
Figure 19:
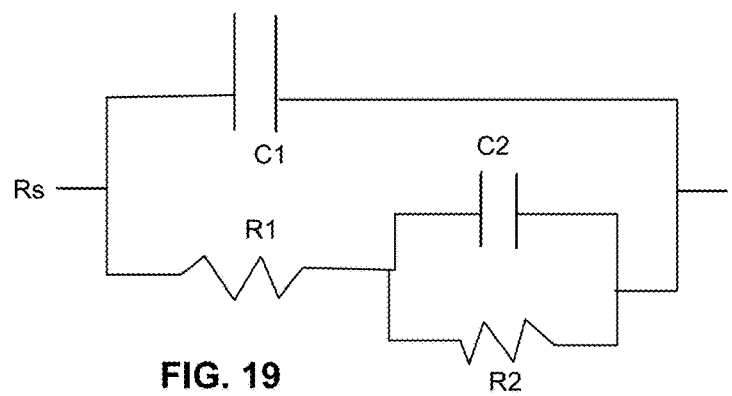
Figure 20A:
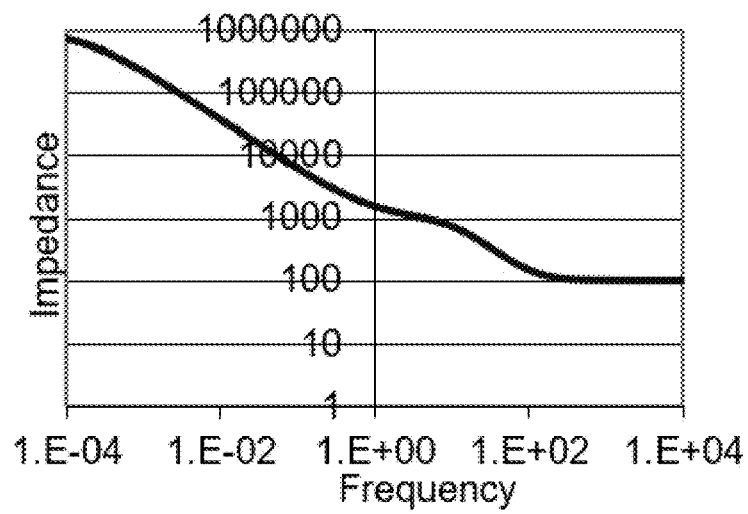
Figure 20B:
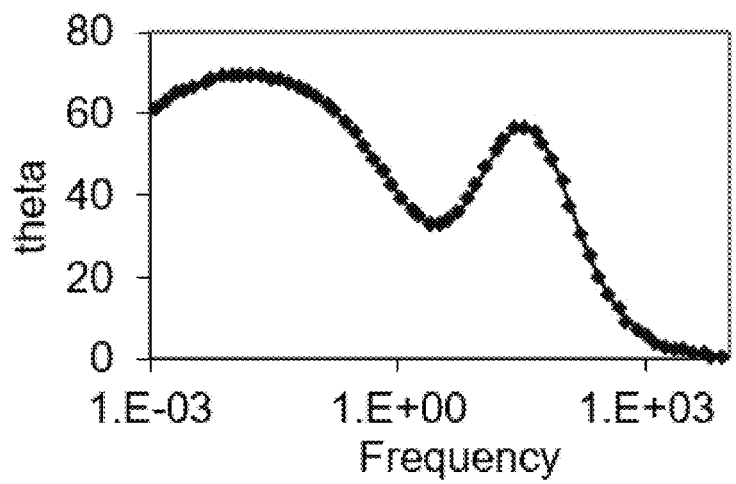
Figure 21:
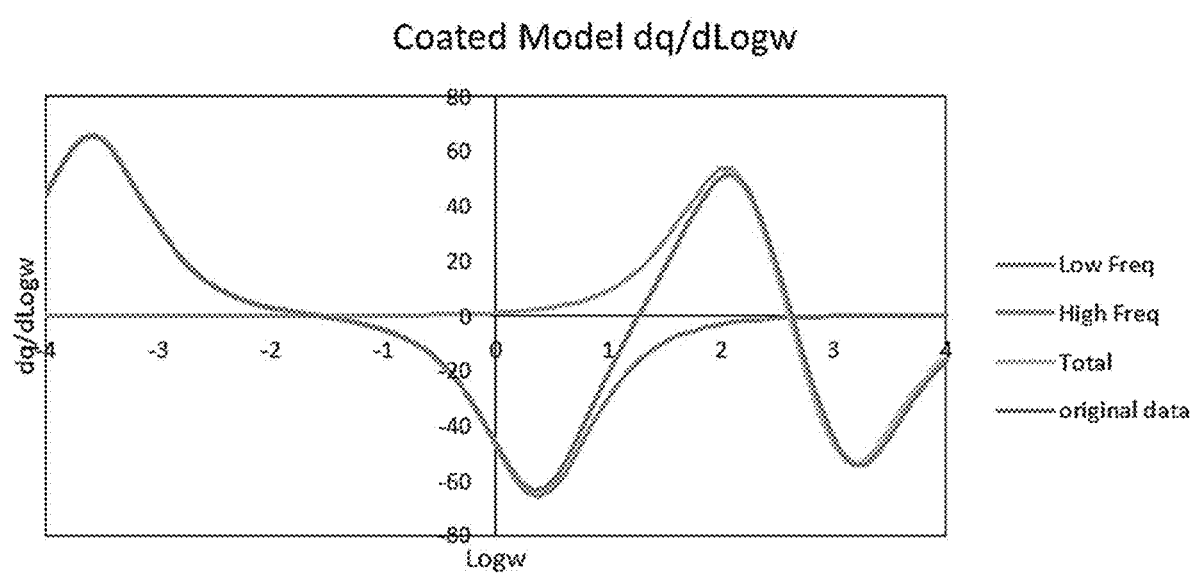
Figure 22A:
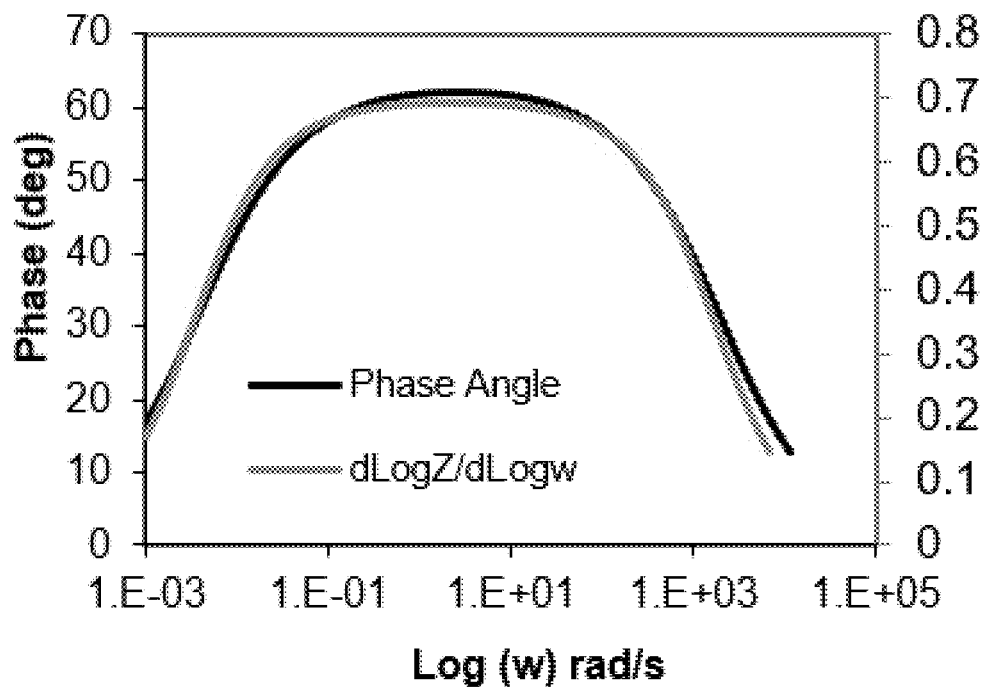
Figure 22B:
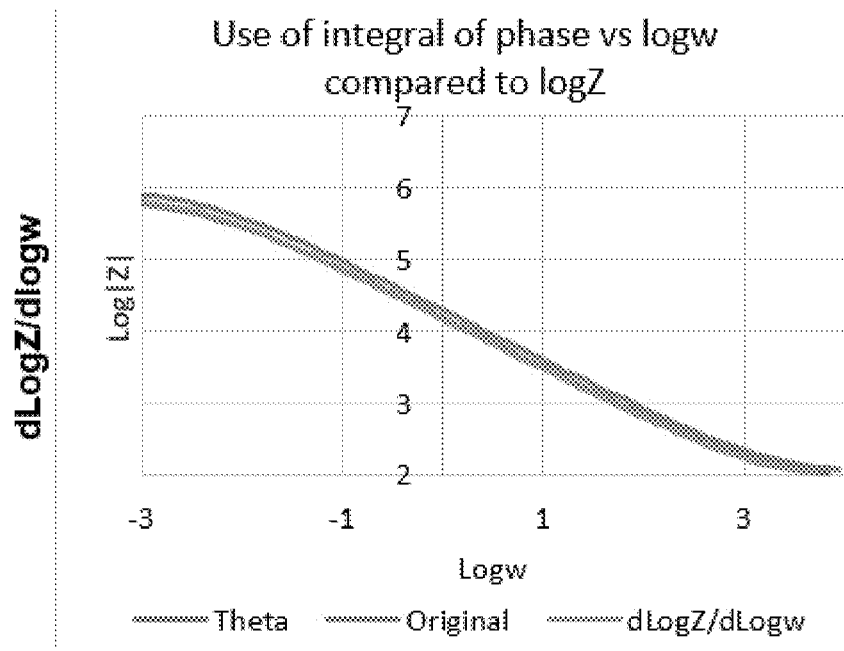
Figure 23A:
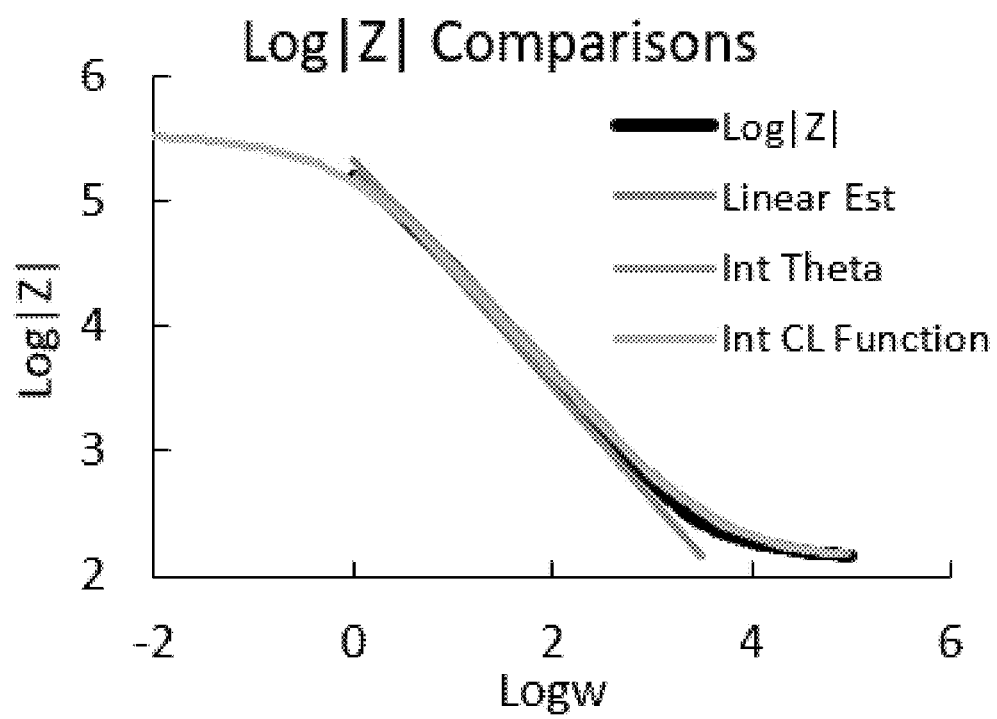
Figure 23B:
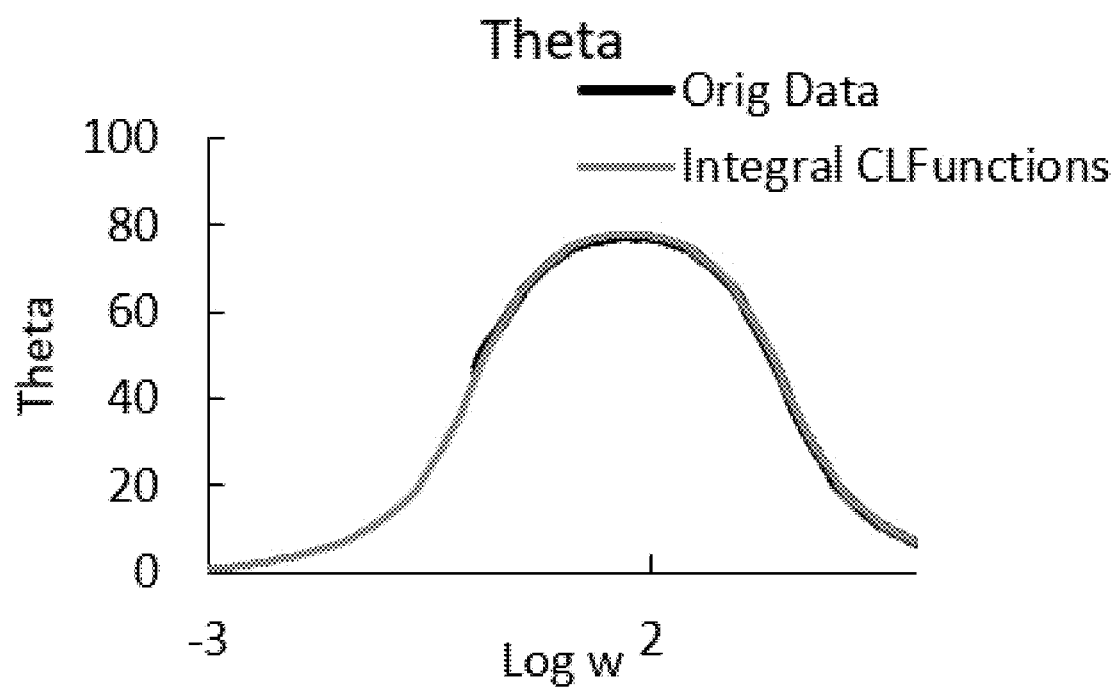
Figure 23C:
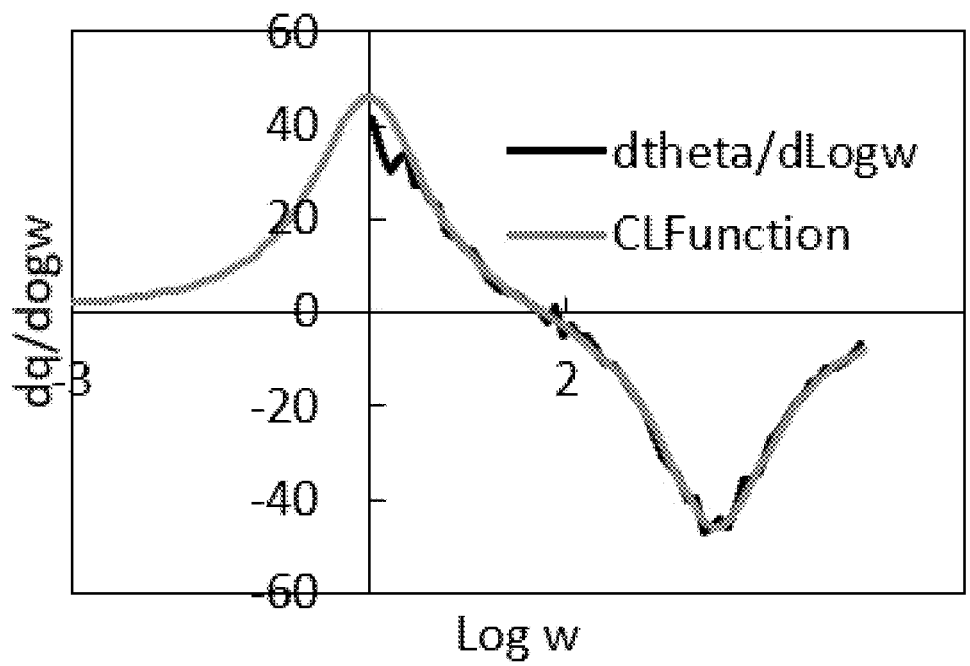
Figure 23D:
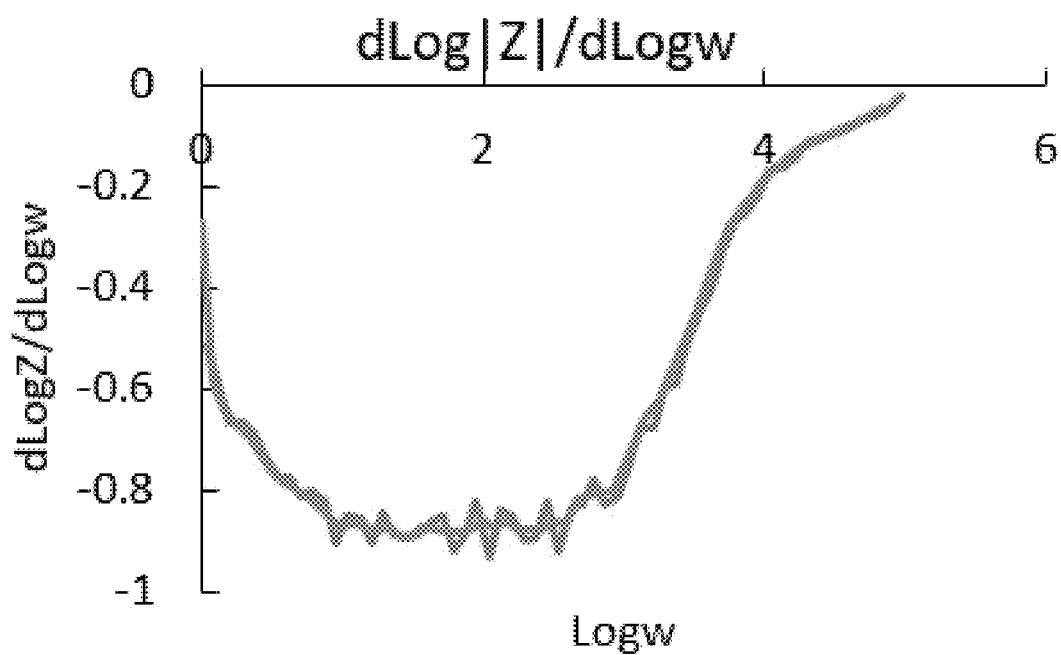

An example of a Randles circuit response and its derivative of the phase is shown in FIGS. 7B-7D, showing FIG. 7B Log$|Z|$ vs Log $\omega$, FIG. 7C Phase vs Log $\omega$ and d Log$|Z|$ vs Log $\omega$, and FIG. 7D $d\theta/d$ Log $\omega$ (from Eq. 11);

FIGS. 8A-8F illustrate respectively calculated Ideal Randles Circuit behavior ($R_s=100$, $R_p=10^6$, $C=10^{-5}$ showing $|Z|$ (FIG. 8A), $\partial 4$ (FIG. 8B), $d\theta/d$ Log $\omega$ (FIG. 8C), $Z''$ (FIG. 8D), Tan $\theta$ (FIG. 8E), and $A''$ (loss admittance) (FIG. 8F), with noting that the elbows of Log$|Z|$, inflection points in $\theta$ and the peaks in $d\theta/d$ Log $\omega$ all correspond to the same Log $\omega$, and that the peaks in $Z''$, Tan $\theta$ and $A''$ are at $\omega_2$, $\omega_x$ and $\omega_1$ for the $d\theta/d$ Log $\omega$ (c) plot and that the peaks in $Z''$ and $A''$ are symmetrically spaced about $\omega_x$;

FIGS. 9A and 9B are respective impedance and phase Bode plot examples similar to FIGS. 4B and 4C, respectively, but with $Rp=10^7$ $\Omega cm^2$ rather than $10^6$ $\Omega cm^2$ as in FIGS. 4B and 4C, and with a lower limit frequency of only 0.01 Hz;

FIG. 10A is a graph illustrating the phase, $\theta$, versus Log $\omega$ from FIG. 4C, with FIG. 10B illustrating a graph of the numerical derivative of the phase with respect to Log $\omega$, and with FIG. 10C illustrating a graph of the absolute value of $d\theta/d$ Log $\omega$;

FIG. 11 is a graph of a comparison of the first derivative of the Phase with Log $\omega$ and the second derivative of $|$Log $Z|$ with Log $\omega$, similar to the plot of FIG. 10C;

FIG. 12 is a graph which is an example of linear analysis of a Log $Z_2$ from knowledge of two frequencies and Log $Z_1$;

FIGS. 13A-13F respectively illustrate CoCrMo experimental EIS data (red) and CPE-Randles analytical equation (black) for phase derivative (FIG. 13A), $|Z|$ (FIG. 13B), $\theta$ (FIG. 13C), $Z''$(FIG. 13D). Tan $\theta$ (FIG. 13E) and Nyquist plot using the values obtained from the fitting approach (FIG. 13F) (see Table 1);

FIGS. 14A-14D illustrate respectively CoCrMo femoral head experimental EIS data (red) and CPE-Randles analytical equation (black) for phase derivative (FIG. 14A), $|Z|$ (FIG. 14B), $\theta$ (FIG. 14C), tan $\theta$ (FIG. 14D) using the values obtained from the fitting approach (see Table 3);

FIGS. 15A and 15B illustrate respectively Bode Diagrams for CoCrMo in phosphate buffered saline (Red—data, Black—fit) for Log$|Z|$ vs Log $\omega$ (FIG. 15A), and Phase Angles $\theta$ versus Log $\omega$ (FIG. 15B);

FIGS. 16A and 16B respectively illustrate Phase derivative plots of data in FIG. 15 using the circuit parameters found by the full ZView® fitting to 0.001 Hz for a) Entire range of frequency tested (FIG. 16A) and Expanded view of the cross-over frequency (FIG. 16B) with analytical function fit using ZView® circuit parameters, 5 point running average of the experimental data, and the experimental data, with note of the common cross-over frequency for all three;

FIG. 17 illustrates the Phase derivative function at the cross-over frequency for an ideal Randles circuit with a $10^8$ difference between $\omega_1$ and $\omega_2$, in comparison to a series RC phase derivative (where Rp is infinite);

FIG. 18 is a graph of a plot of d Log$|Z|$/d Log $\omega$ vs Log $\omega$ to show how to obtain a from the experimental (measured) data;

FIG. 19 represents a schematic of a coating model typically used in impedance analysis of more complex systems, where the Cs are replaced with constant phase elements, each with their own exponents for a more generalized analysis;

FIGS. 20A and 20B illustrate respective impedance and phase Bodes plots of an exemplary CPE-based coating model using Table 5 parameters;

FIG. 21 is a further analysis of two sets of anti-symmetric peak function pairs used to fit the $d\theta/d$ Log $\omega$ vs Log $\omega$ plots, with Table 6 showing the parameters of the two pairs of C-L functions used to fit the data;

FIG. 22A is a plot of both the d Log$|Z|$/d Log $\omega$ vs Log $\omega$ and phase angle in degrees vs Log $\omega$ on the sample plot, obtained per the original Randles Circuit constant phase element model from FIG. 4A;

FIG. 22B is an illustration of the original Log$|Z|$ vs Log $\omega$ relative to the subject matter of FIG. 22A and the respective results from integrations thereof using both forms of Eq. 36;

FIGS. 23A and 23B show, respectively, Log$|Z|$ and $\theta$ (q) vs Log $\omega$, dq/d Log $\omega$ and d Log$|Z|$/d Log $\omega$, for certain experimental test data as described herein;

FIG. 23C shows the application of using Cauchy-Lorentz (CL) functions applied to certain experimental data for determination over an entire frequency range, with the CL functions determined by finding the function with the least squares error to the numerical derivative of the Phase vs Log $\omega$ data; and FIG. 23D charts d Log$|Z|$/d Log $\omega$ versus Log $\omega$ relative to data associated with FIG. 23C.

Repeat use of reference characters in the present specification and drawings is intended to represent the same or analogous features or elements or steps of the presently disclosed subject matter.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Exemplary aspects of the present disclosure are directed to methods of Electrochemical Impedance Spectroscopy (EIS) analysis.

In particular, presently disclosed methods of Electrochemical Impedance Spectroscopy (EIS) analysis have broad applicability in any field where corrosion monitoring or measurement of the impedance behavior of an electrode is important, such as for inspection of corrosion susceptibility or damage.

Some existing methodologies used to determine the parameters of electrochemical impedance spectra (EIS) circuits relies on a "complex non-linear least squares fitting algorithm" (CNLS) to define the circuit elements. These fitting approaches rely on a functional optimization approach (least squares fitting) to fit the captured data with a function (or set of functions) with the least error between the function and the data, with little knowledge or understanding of the underlying processes giving rise to the variations or the properties of the functions being fitted. There are often limitations in the acquired data, particularly in the low frequency regime, where such fitting approaches are not able to accurately determine the circuit parameters describing the impedance behavior of the electrode.

In the present disclosure, an alternative approach, based on the symmetry of the EIS response for a range of models including such as the Constant Phase Element (CPE) Randles Circuits, and other more complex coated model electrochemical circuits, is developed which allows for determination of the low frequency response of the impedance based only on knowledge of the high frequency portion of the response. In particular, the polarization resistance of an electrode surface can be determined using only the high frequency half of the EIS spectra. This presently disclosed approach relies on the concept that symmetry relationships in the EIS information across the log frequency range can be exploited.

One exemplary advantage of the presently disclosed method of Electrochemical Impedance Spectroscopy (EIS) analysis approach is that the time required to capture the impedance behavior is dramatically shortened since the low frequency response can be predicted from only the high frequency (typically above 1 Hz) behavior. Instead of requiring hours to perform, the presently disclosed method can shorten this time to less than 1 minute and in some cases to just a few seconds. Some examples herewith are based on measurement tests from 20,000 Hz to 1 and 0.1 Hz to see how long it takes with the EIS test instruments. The time can also depend on how many data points are collected over the range of frequencies (usually in an even log interval). For example, 20000 to 1 Hz takes 16 secs (5 pts/Dec), 25 secs (8 pts/Dec) and 32 secs (10 pts/Dec). 20000 to 0.1 Hz takes between 190 and 240 secs depending on points/Dec).

The potential application of the presently disclosed method includes in any field where corrosion or impedance testing is important, including the energy industry, battery industry, medical field, transportation (air, train, car, truck, ship), etc. In addition, alternative Transfer Function systems (e.g., Complex Modulus, Dielectric Relaxation, etc.) can similarly be evaluated using these approaches.

One exemplary approach used in this presently disclosed subject matter is analysis of the phase angle and Log of the impedance magnitude behavior with Log of the frequency of such circuits as a tool to find the low frequency (e.g., polarization resistance) behavior from only the high frequency response. This approach relies on the properties of ideal and non-ideal RC circuits and the combination of the Log Z and phase angle ($\theta$) versus Log $\omega$ behavior to allow for determination of the parameters of the circuit, without using non-linear least squares fitting approaches. In particular, there is symmetry in the phase angle ($\theta$) vs log w response that is exploited in this analysis. As a result, the experimental data does not require the entire frequency range (especially in the low frequency region) to determine the behavior, yet the symmetry properties will allow for determination of the low frequency response (i.e., Rp).

While the principles outlined here apply to electrode systems that respond as RC, R-CPE or CPE-Randles circuit systems, more complex, so-called "coated model" electrode systems can also be analyzed using this approach. Examples of the use of this approach with real experimental data will be shown, and the limits of this approach and the applicability to other circuit element models will be discussed.

The method developed here was designed principally for use in the study of medical alloys and for metallic implants comprised of these alloys and could be incorporated into, for example, electrochemically-based sensors where impedance measurements are important to the performance or monitoring of metallic implant performance. It is likely that another useful application of the presently disclosed method is in the area of EIS sensors.

The basic analysis presently disclosed is based on an understanding of the relationships between the phase angle, $\theta$ and the $\text{Log}_{10}|Z|$ versus the $\text{Log}_{10}\omega$ for impedance-based systems. In particular, the derivatives of these functions are of interest.

Electrochemical Impedance Spectroscopy (EIS) is a widely-used technique to assess the electrical performance of electrode interfaces[1-3]. This is particularly true in the metallic biomaterials field where EIS analysis is commonly used to compare different materials or surface treatments in terms of their electrical characteristics[4,5]. The method involves application of a small sinusoidal voltage (or current) to the electrode of interest and measurement of system response (current or voltage) in terms of amplitude and phase angle. The most notable property of interest, impedance, is obtained by complex division of ac voltage by ac current. After sweeping a range of frequencies, the properties of electrode systems (i.e., the resistive and capacitive character of the surface and solution) are obtained by fitting the impedance data to an equivalent circuit. However, it is often the case that the analysis and interpretation of underlying electrical behavior of an electrode surface relies on very low frequency measurements requiring many hours to obtain the electrode surface properties (e.g., polarization resistance, Rp, capacitance, etc.). These parameters are often difficult to capture due to constraints imposed by the experimental equipment, or because the conditions of the experiment (and the parameters as well) may change over the time course of the experiment.

EIS analysis softwares[6] generally use algorithms developed by Levenberg[7] and Marquardt[8] amongst others to determine the parameters of EIS circuits by performing complex non-linear least squares fitting[9-12] (CNLS). These fitting approaches rely on a functional optimization approach (least squares fitting) to fit the captured impedance spectrum with a function (or set of functions) with the least error between the function and the data, with little knowledge or understanding of the underlying processes giving rise to the variations or the properties of the functions being fitted. There are often limitations in the acquired data, particularly in the low frequency regime, where such fitting approaches are not able to accurately determine the circuit parameters describing the impedance behavior of the electrode. Also, the CNLS algorithms optimize fit over the entire spectrum and can lead to poor fit over small sections of the spectrum. If these small sections fall in the area of interest (i.e. low frequency spectrum), then the calculated parameters are inevitably prone to error. For example, FIG. 1 shows the EIS spectra of a retrieved CoCrMo (ASTM F1537[14]) femoral head immersed in phosphate buffered saline (PBS) solution. The experimental data showed good fit using the CNLS software in the high frequency regime but the software predicted an estimated value for low frequency impedance i.e. polarization resistance (Rp), as $10^{13}$ $\Omega cm^2$ which is orders of magnitude higher than reported in literature.

In this work, an alternative approach for analysis of equivalent circuits, based on the symmetry of the EIS response across the log of the frequency (specifically, the derivative of the phase angle with respect to Log of the frequency), is developed which allows for determination of the low frequency response of the impedance based only on the measurement of the high frequency portion of the response and symmetry of the phase angle across log of the frequency. A range of models, from simple RC circuits to the Constant Phase Element (CPE) Randles circuits are analyzed mathematically to demonstrate the symmetry behavior of the functions and the underlying link to model parameters these symmetry relationships reveal. Of particular interest is the ability to determine the polarization resistance of an electrode surface using only the high frequency half of the EIS spectra. This proposed method can, therefore, shorten the time to just a few minutes or less than 1 minute in some cases.

This new method of Electrochemical Impedance Spectroscopy (symmetry-based EIS, or sbEIS) analysis has broad applicability in any field where corrosion monitoring or measurement of the impedance behavior of an electrode is important for inspection of corrosion susceptibility or damage. A principal advantage of this approach is that the time required to capture the impedance behavior is dramatically shortened (or the low frequency range that can be analyzed is extended) since the low frequency response can be predicted from only the high frequency (typically above 1 Hz) behavior. This makes the analysis particularly useful for low powered wireless sensors that cannot capture data in the low frequency range. In addition, a more predictive and direct approach to parameter determination is developed where the link between circuit parameters, characteristic frequencies and phase response can be exploited.

While the principles outlined here apply to electrode systems that respond as RC, R-CPE or CPE-Randles circuit systems, more complex, so-called "coated model" electrode systems also may be analyzed using this approach. Examples of the use of this approach with real experimental data are shown, and the limits of this approach and the applicability to other circuit element models will be discussed.

Mathematical Development

The analysis proposed here is based on an understanding of the relationships between the phase angle, θ and the $Log_{10}|Z|$ versus the $Log_{10}\omega$ for impedance-based systems. In particular, the derivatives of these functions, and their symmetry with respect to Log ω are of interest. Starting with basic electrical circuits, the analysis will build the foundation to analyze more complex circuits like CPE-Randles.

1. Series RC Circuit

To begin with, the simplest R-C circuit simulating an ideally-polarizable electrode (i.e., resistor in parallel with a capacitor (see FIGS. 2A-2C) results in |Z| and θ of:

$$|Z| = \left(R^2 + \frac{1}{(\omega\tau)^2}\right)^{1/2} \quad \text{Eq. 1}$$

$$\text{and } \theta = \tan^{-1}\left(\frac{-1}{\omega\tau}\right) \quad \text{Eq. 2}$$

where τ=RC, and ω is the angular frequency in radians per second (rad/s). Note, frequency, f, in EIS data is typically provided in Hz. These need to be converted into rad/s using ω=2πf for the analysis below.

Figure 3:
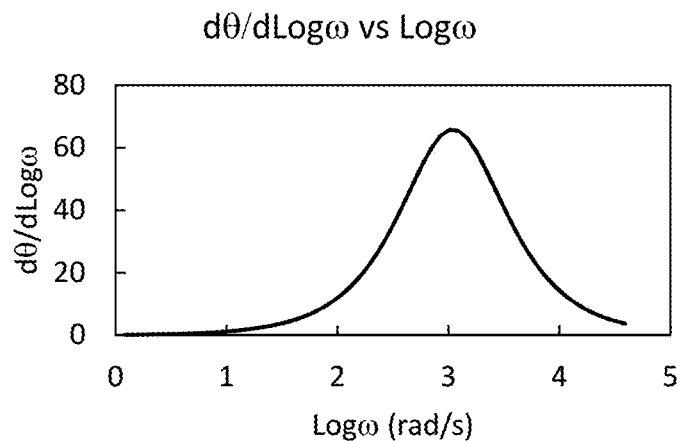
FIG. 3 shows a plot of Eq. 6 for the circuit shown in FIG. 2A.

Note that the behavior over Log ω shows that the time constant, τ=RC, occurs at the inflection point of the phase angle and the elbow of the Log|Z| vs Log ω response. The derivatives of interest for Log|Z| and θ with respect to Log ω and are:

$$\frac{dLog|Z|}{dLog\omega} = \frac{-1}{1+(\omega\tau)^2} \quad \text{Eq. 3}$$

and $$\frac{d^2Log|Z|}{dLog\omega^2} = \frac{-2\omega\tau}{[1+(\omega\tau)^2]^2} \quad \text{Eq. 4}$$

and for θ

$$\frac{d\theta}{dLog\omega} = 2.303\frac{d}{dU}\tan^{-1}(U)\frac{dU}{d\omega}\frac{d\omega}{dLog\omega} = 2.303\frac{\omega}{1+U^2}\frac{dU}{d\omega} \quad \text{Eq. 5}$$

where $U = \frac{Z''}{Z'} = \frac{-1}{\omega\tau}$, or $$\frac{d\theta}{dLog\omega} = 2.303\frac{180}{\pi}\frac{\omega\tau}{1+(\omega\tau)^2} \, (deg) \quad \text{Eq. 6}$$

where θ is in degrees and ω is in rad/s. This function will be referred to as the phase derivative in the remainder of this paper. FIG. 3 shows a plot of Eq. 6 for the circuit shown in FIGS. 2A-2C. It should be noted that this Cauchy-Lorentz like function has a maximum at ω=1/τ, occurs at the inflection point for the phase, and occurs at the location of the elbow in the Log|Z| behavior (see FIGS. 2A-2C).

This function reflects the change from a resistive to a capacitive response for the circuit as the frequency decreases from high to low (FIG. 2A). The peak height of the phase derivative reaches 2.303*180/2π=65.98 (see FIG. 3) at the characteristic frequency (ω=1/τ). It should be noted that a similar plot as FIG. 3 can be obtained by taking a numerical derivative of the Phase vs Log ω data obtained from an EIS experimental data. The resistance, R, can be found from the high frequency impedance (R=|Z| as ω→infinity) and the capacitance, C, can be determined from the time constant, τ, and R (C=τ/R).

b) Series R-CPE Circuit

For a series R-CPE model, similar equations can be developed where the impedance of a CPE is:

$$Z_{CPE} = \frac{1}{(i\omega)^\alpha Q} \quad \text{Eq. 7}$$

where α varies between 0 and 1. Typically, α is close to one for most systems (e.g., 0.9, 0.8, etc.) and the CPE element behaves nearly like a capacitor. The parameter Q is capacitive-like when α is near 1 and resistive like when α is near 0.

The CPE impedances are summed using the rules for resistors in series and parallel (i.e., resistors in parallel sum as the reciprocal, while resistors in series simply sum). Using these rules and Euler's identity $$i^\alpha = [e^{i\frac{\pi}{2}}]^\alpha = e^{i\alpha\frac{\pi}{2}} = \cos\left(\alpha\frac{\pi}{2}\right) + i\sin\left(\alpha\frac{\pi}{2}\right) \qquad \text{Eq. 8}$$

the RC circuit in FIGS. 2A-2C replaces the capacitor with the CPE impedance and results in:

$$Z = R + \frac{\cos\left(\alpha\frac{\pi}{2}\right)}{\omega^\alpha Q} - i\frac{\sin\left(\alpha\frac{\pi}{2}\right)}{\omega^\alpha Q} \qquad \text{Eq. 9}$$

and derivative of the phase with respect to Log ω:

$$\frac{d\theta}{d\text{Log}\omega} = 2.303\frac{180}{\pi}\frac{\alpha RQ\omega^\alpha \sin\left(\alpha\frac{\pi}{2}\right)}{\left(RQ\omega^\alpha + \cos\left(\alpha\frac{\pi}{2}\right)\right)^2 + \sin^2\left(\alpha\frac{\pi}{2}\right)} \qquad \text{Eq. 10}$$

where the 2.303 comes from the $\text{Log}_{10}$ function, and 180/π converts the result from radians to degrees. It should be noted that Eq. 10 reverts to Eq. 6 when α=1. This function results in a similar plot as shown in FIGS. 4A-4C, however, the peak is spread wider with lower α and shifted in frequency (see FIGS. 4A-4C). FIGS. 4A, 4B and 4C, show the Log|Z|, phase, θ, and derivative of the phase, respectively, for both an ideal RC circuit and an R-CPE circuit (α=0.8). Similar results between the ideal and CPE circuits are obtained, however, the series R-CPE circuit lowers the slope of the Log|Z| vs Log ω plot (FIG. 4A) and decreases the maximum (most negative) phase angle reached (FIG. 4B). It also decreases the peak in the phase derivative and shifts its peak location to higher frequencies as well (FIG. 4C). Both the peak height and peak frequency for the phase derivative can be determined as shown below.

The characteristic frequency for this peak function (i.e., the frequency where the phase derivative function is a maximum) is defined by $$\omega_1 = \frac{1}{(RQ)^{1/\alpha}} \qquad \text{Eq. 11}$$

and the magnitude of the peak of the phase derivative function at the characteristic frequency depends only on □, the CPE exponent $$\left.\frac{d\theta}{d\text{Log}\omega}\right|_{\omega=\omega_1} = 2.303\frac{180}{\pi}\frac{\alpha\sin\left(\alpha\frac{\pi}{2}\right)}{\left(1 + \cos\left(\alpha\frac{\pi}{2}\right)\right)^2 + \sin^2\left(\alpha\frac{\pi}{2}\right)} \qquad \text{Eq. 12}$$

Figure 5:
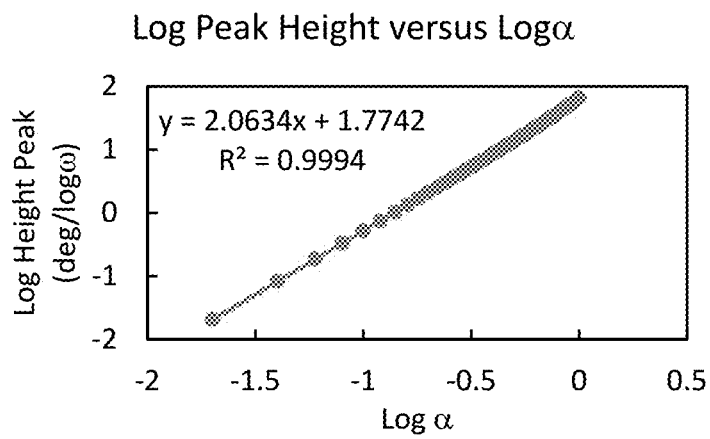
FIG. 5 is a plot of the variation in the Log of the peak height of the phase derivative versus log of the CPE exponent, $\alpha$ (with a note that the Log-Log linear relationship is observed)

Equation 12 can be recast as a Log-Log linear function of peak height versus α (see FIG. 5) as $$Y = 2.0634x + 1.7742 \qquad \text{Eq. 13}$$

where Y is the $\text{Log}_{10}$ of the Phase derivative at the peak frequency and x is $\text{Log}_{10}\alpha$. That is, plotting Eq. 12 on a Log-Log plot over the range of α results in a near-linear function (Eq. 13). Or, $$\text{Log}\alpha = \frac{\text{Log}\left[\left.\frac{d\theta}{d\text{Log}\omega}\right|_{\omega_1}\right] - 1.7742}{2.0634} \qquad \text{Eq. 14}$$

where θ is in degrees. Therefore, the constant phase element exponent, α, is directly linked to the peak height of the phase angle derivative versus Log ω function at the characteristic frequency, $\omega_1$, and this peak height can be used as a means for determining the value of α.

Thus, if R (the high frequency resistance), and $\omega_1$, the characteristic frequency, are known, then α can be found from the peak height (Eq. 14) and Q can be directly determined from use of Eq. 11. Thus, the circuit elements can be determined directly from this analysis without the need for a non-linear least square fitting of the data.

2. Parallel RC and R-CPE Circuit

As with the analysis for the elements in series, the values of |Z| and dθ/d log ω can be determined for a parallel configuration of R and C or R and CPE elements. The equations are:

Ideal CPE $\qquad \text{Eq. 15}$ $$|Z| = R\frac{1}{[1 + (\omega\tau)^2]^{1/2}},$$

$$Z^* = R\left[\frac{1 + (\omega\tau)^\alpha\cos\left(\alpha\frac{\pi}{2}\right) - i(\omega\tau)^\alpha\sin\left(\alpha\frac{\pi}{2}\right)}{1 + 2(\omega\tau)^\alpha\cos\left(\alpha\frac{\pi}{2}\right) + (\omega\tau)^{2\alpha}}\right]$$

$$\frac{d\theta}{d\text{Log}\omega} = -\frac{\omega\tau}{1 + (\omega\tau)^2},$$

$$\frac{d\theta}{d\text{Log}\omega} = -\frac{\alpha(\omega\tau)^\alpha\sin\left(\alpha\frac{\pi}{2}\right)}{1 + 2(\omega\tau)^\alpha\cos\left(\alpha\frac{\pi}{2}\right) + (\omega\tau)^{2\alpha}}$$

where $\tau = (RQ)^{1/\alpha}$ (Note, the denominator in the CPE expressions is equivalent to the denominator in Eq. 12.)

Figure 6A:
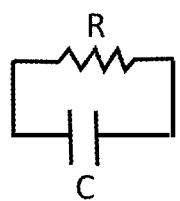
FIG. 6A is a schematic representation of a simple RC parallel circuit.
Figure 6B:
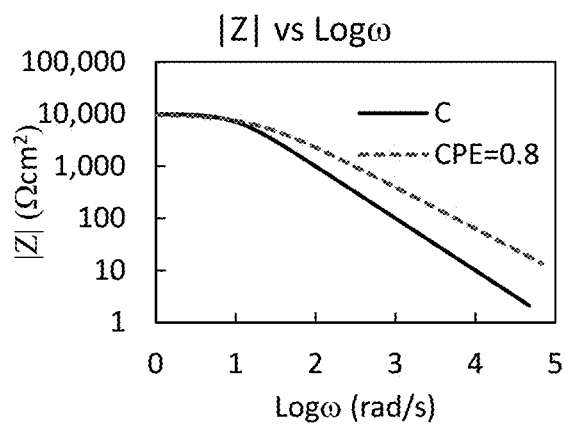
FIGS. 6B-6D respectively illustrate plots of Impedance (FIG. 6B), phase (FIG. 6C) and phase derivative (FIG. 6D) behavior over Log $\omega$ for ideal parallel RC and parallel R-CPE ($\alpha=0.8$) behavior.
Figure 6C:
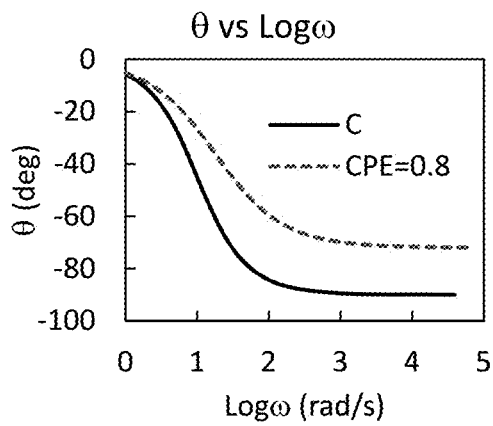
Figure 6D:
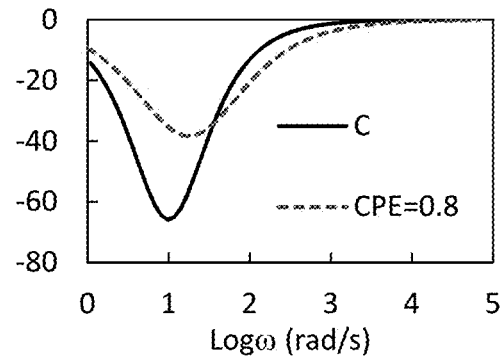

The behavior of the parallel RC (FIG. 6A) and R-CPE circuits is shown in FIGS. 6B-6D. In these cases, the circuit is resistive at low frequencies and capacitive at high frequencies and the transition occurs at the time constant for the circuit. The peak height function for the phase derivative is identical to the phase derivative function for the series circuit only it is inverted (negative sign) and is a maximum at the characteristic frequency ($\omega_2 = 1/\tau_2 = 1/(RQ)^{1/\alpha}$) which occurs at the elbow of the Log|Z| vs Log ω plot (see FIGS. 6B-6D.)

The performance of an ideal Randles circuit, or a CPE-Randles circuit can be directly discerned from the combination of the series and parallel circuit analysis behavior where each type of response is present on a different portion of the Log ω scale. The symmetry in the phase derivative functions will provide the ability to determine the low frequency response from the high frequency behavior.

3. Ideal Randles Circuit

The Randles circuit (see FIG. 7A) is a commonly used model for electrode interfaces where the capacitance is often replaced with a constant phase element (CPE). For now, the CPE will be assumed to act like an ideal capacitor.

The impedance equations for a Randles circuit are:

$$Z = Z' + iZ'' = R_s + R_p\left(\frac{1 - i\omega\tau}{1 + (\omega\tau)^2}\right) \qquad \text{Eq. 16}$$

where $i=\sqrt{-1}$, $\tau=R_pC$, and $R_s$ is the solution resistance, C is the capacitance and $R_p$ is the electrode polarization resistance. Also, $$|Z| = (Z'^2 + Z''^2)^{1/2} \qquad \text{Eq. 17}$$

and $$\theta = \tan^{-1}\left[\frac{Z''}{Z'}\right] \qquad \text{Eq. 18}$$

where $\theta$ is the phase angle of the impedance.

Here, the derivative of the phase with log $\omega$ (Eq. 5) is repeated here $$\frac{d\theta}{d\text{Log}\omega} = 2.303\frac{1}{1+U^2}\frac{dU}{d\omega}\frac{d\omega}{d\text{Log}\omega} = 2.303\frac{\omega}{1+U^2}\frac{dU}{d\omega} \qquad \text{Eq. 19}$$

where $U = \frac{Z''}{Z'}$

Using an ideal Randles Circuit model, one can find an analytical expression for $d\theta/d$ Log $\omega$ using the above approach. The expression in the units of degrees is:

$$\frac{d\theta}{d\text{Log}\omega} = 2.303\frac{b}{a^2+b^2}(-a + 2R_s(\tau\omega)^2)\frac{180}{\pi} \qquad \text{Eq. 20}$$

where
$a=R_s(1+(\omega\tau)^2)+R_p$, $b=R_p\tau\omega$ and $\tau=R_pC$. An alternative form of this equation can be derived as $$\frac{d\theta}{d\text{Log}\omega} = 2.303\frac{180}{\pi}\frac{\tau_2}{\tau_1}\left[\frac{\omega\tau_2 - \frac{1}{\omega\tau'}}{(1+(\omega\tau_2)^2)\left(1 + \frac{1}{(\omega\tau')^2}\right)}\right] \qquad \text{Eq. 21}$$

where $\tau_1=R_sC$ and $\tau_2=R_pC$, and $\tau'$ is defined by $$\frac{1}{\tau'} = \frac{1}{\tau_2} + \frac{1}{\tau_1} \qquad \text{Eq. 22}$$

An example of a Randles circuit response (Log|Z|, phase angle, $\theta$, and the derivative of the phase) is shown in FIGS. 7B-7D.

The phase derivative function (FIG. 7C) is a symmetric, odd function with a point of symmetry (Log of the crossover frequency, Log $\omega_x$) about which the function is identical in shape but opposite in sign.

The crossover frequency, Log $\omega_x$, is where the phase derivative (FIG. 7C) is equal to zero and occurs at the maximum in the phase and the maximum in the Tan $\theta$. This represents the log $\omega$ point of symmetry and can be found by setting Eq. 20 to zero which yields $a=2R_s(\omega_x\tau_2)^2$, which, when solved for Log $\omega_x$ becomes $$\text{Log}\omega_x = \frac{1}{2}\left[\text{Log}\frac{1}{\tau_2} + \text{Log}\left(\frac{1}{\tau_2} + \frac{1}{\tau_1}\right)\right] \text{ or, if } \tau_1 \ll \tau_2 \qquad \text{Eq. 23}$$

$$\text{Log}\omega_x = \frac{1}{2}\left[\text{Log}\frac{1}{\tau_2} + \text{Log}\frac{1}{\tau_1}\right] \qquad \text{Eq. 24}$$

This latter calculation of the crossover frequency holds for cases when $R_p$ is just a few hundred ohms larger than $R_s$ and higher. The cross-over frequency, $\omega_x$, is defined by the two time constants, $\tau_1$ and $\tau_2$, which are themselves defined by $R_s$, $R_p$ and C (for the ideal Randles circuit). Thus, $\omega_x$ is comprised of all parameters of the circuit and indicates that knowledge of this parameter (in mid- to high-frequency) and the fact that the phase derivative is symmetric about this frequency, allows determination of the low frequency response.

It should be noted that the analytical expression for $d\theta/d$ Log $\omega$ (Eq. 21) can also be equivalently represented as the sum of two responses according to Eqs. 6 and 15 (as the sum of the two functions found for the series and parallel RC circuits described above, Eq. 25). Equation 25 and Eq. 21) are identical representations of the Phase derivative response with Log $\omega$.

$$\frac{d\theta}{d\text{Log}\omega} = 2.303\left(\frac{180}{\pi}\right)\left[\frac{\omega\tau'}{1+(\omega\tau')^2} - \frac{\omega\tau_2}{1+(\omega\tau_2)^2}\right] \qquad \text{Eq. 25}$$

where $\tau'$ is defined in Eq. 22 (and approximately $\tau_1$ when $\tau_2 \gg \tau_1$) and is the time constant (or reciprocal of the peak frequency) for the higher frequency peak and $\tau_2$ is for the lower frequency peak. The higher frequency time constant is $\tau_1=R_sC$, while $\tau_2=R_pk$ represents the lower frequency portion. Also, these time constants correspond to the reciprocal frequencies where the loss admittance (A") and loss impedance (Z") reach their peak value and where there is a bend (elbow) in the Log|Z| vs Log $\omega$ plot (see FIG. 8A).

The symmetry of the phase derivative over Log $\omega$ can assist in the determination of the low frequency response based on the high frequency response. That is, if the derivative of the phase is known from high frequency up to the crossover frequency, $\omega_x$, then symmetry requires that a second phase derivative peak will occur at $\omega_2$ defined by $\omega_1$ and $\omega_x$.

If $R_s$ and $\tau_1$ are known from the higher frequency impedance response and $\omega_x$ is determined as well, then $\tau_2$ can be determined from $$\text{Log}\omega_x = \frac{1}{2}\left(\text{Log}\frac{1}{\tau'} + \text{Log}\frac{1}{\tau_2}\right) \qquad \text{Eq. 26}$$

The capacitance, C, of the Randles circuit can be found from $$C = \frac{\tau_1}{R_s} = \frac{1}{R_s\omega_1} \qquad \text{Eq. 27}$$

Similarly, once C and $\omega_x$ are known, then $R_p$ can be determined from $$R_p = \frac{\tau_2}{C} = \frac{1}{\tau_1 \omega_x^2 C} = \frac{R_s}{(\tau_1 \omega_x)^2} = R_s \frac{\tau_2}{\tau_1} \qquad \text{Eq. 28}$$

This demonstrates that the symmetry of the phase allows for using the high frequency behavior to determine the low frequency response ($R_p$) and the other elements of the circuit ($R_s$ and C).

Figure 8A:
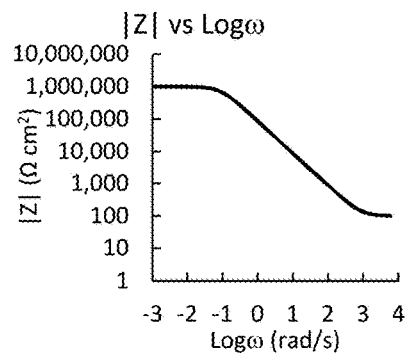
Figure 8B:
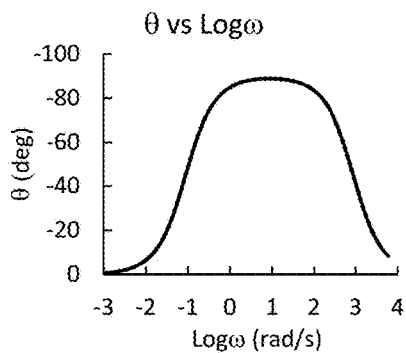
Figure 8C:
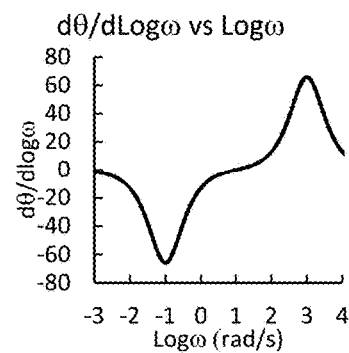
Figure 8D:
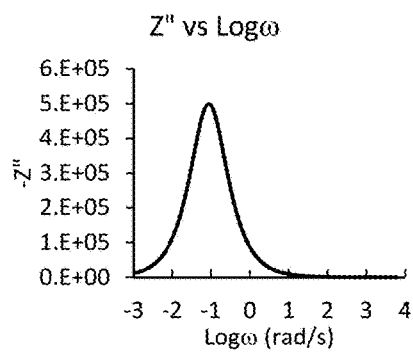
Figure 8E:
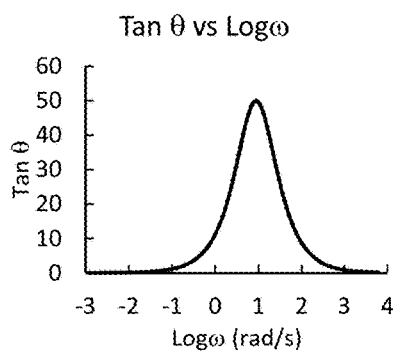
Figure 8F:
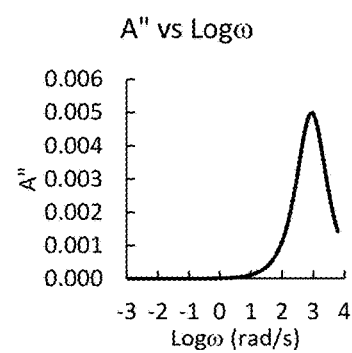

An example of the impedance response of ideal Randles circuit behavior is shown in FIGS. 8A-8F. The circuit parameters are: $R_s$=100, $R_p$=10$^6$, C=10$^{-5}$. Shown in the Log|Z| and θ vs Log ω (Bode) plots (FIGS. 8A and 8B) and the phase angle derivative (FIG. 8C). Also shown are Z", Tan θ, and A" versus Log ω, see FIGS. 8D-8F, respectively.

These plots graphically show the relationships between the various representations of the Randles circuit behavior. The phase derivative (FIG. 8C) has two peak frequencies and a crossover frequency. The peak frequencies correspond to the elbows in the Log|Z| plots and the inflection points for the θ vs Log ω plot (FIG. 8B) and the cross-over frequency is the frequency where there is a maximum in the phase angle. In addition, Z", Tan θ and A" have peaks (maxima) that correspond to the peak frequencies, $\omega_2$, $\omega_x$ and $\omega_1$, in the phase angle derivative plot. Thus, the relationships between the phase derivative and these other elements of the impedance response can be understood and used in the analysis. For example, the peak in Tan θ can be used to define $\omega_x$ and the peaks in A" and Z" can be used for determination of the peak frequencies $\omega_1$ and $\omega_2$, respectively.

The derivative of the phase plot (FIG. 8C) consists of three overlapping representations of the phase derivative with Frequency (Eq. 20, 21 and 25). This shows that each is an identical representation of the derivative function and are equivalent. Thus, a more complete understanding of the Bode diagrams can be made from these plots. First, the high frequency elbow of Log|Z| is dependent on the capacitance, C, and $R_s$ values. Similarly, the low frequency elbow is determined by $R_p$ and C. Thus, the width of the θ vs Log ω plot (and the span of the Log ω where |Z| rises) is simply based on the difference in $R_s$ and $R_p$, since C is the same in each.

Typical impedance data obtained from measurements of metallic biomaterial surfaces immersed in physiological saline solutions (e.g., Phosphate Buffered Saline, PBS) are often highly reproducible for the higher frequency side of these plots; however, the lower frequency region often has issues that make determination of Rp (in particular) difficult to obtain. For example, for FIGS. 9A and 9B, if the Rp is significantly higher than shown in FIG. 8A, or the lower frequencies measured do not go to low enough frequencies to capture the upper plateau region, then the CNLS approach often cannot accurately determine this upper value. This can place significant limits on our understanding of the electrode's response because of the incomplete information obtained from the experiment.

FIGS. 9A and 9B are respective impedance and phase Bode plot examples but with Rp=10$^7$ Ωcm$^2$ rather than 10$^6$ Ωcm$^2$ as in FIGS. 8A and 8B, respectively, and with a lower limit frequency of only 0.01 Hz. These conditions do not allow for capture of the entire frequency range and provide little ability to find the Rp in these data.

The approach, as presently disclosed and used herewith, is to utilize the symmetry properties and information from the phase and Log|Z| vs Log ω data to accurately extrapolate the low frequency plateau value for Z based on the high frequency response of the system. To accomplish this, returning to FIGS. 8A and 8B, there are some important properties and information to be gleaned from these data and the basic behavior of CPE-Randles circuits (or, in general electrochemical systems). First, the phase response has a symmetry with log ω at the high and low sides of the behavior as shown earlier. This symmetry is true for all CPE-Randles behavior regardless of the value of the exponent (α). Interestingly, the "elbows" in the Log|Z| vs Log ω response (see arrows in FIGS. 8A and 8B) at high and low frequencies occur at the inflection point of the rise and fall of the phase angle with decreasing frequency. These relationships, and the symmetry of the response can be used to determine Rp without knowing or observing the plateau in the Log|Z| Bode diagram at low frequencies. Indeed, because of the mirror symmetry of the Phase response, one only needs to find the high frequency phase behavior up to the maximum Phase to determine the entire rest of the behavior of the system at lower frequencies (assuming a CPE Randles behavior).

Linear Approximation Method to Determine Rp

One simple approximation to find $R_p$ is a simple linear estimate based on the frequencies where the inflection point in the Phase starts and stops, and the value of Log|Z| at the high frequencies can be used to find $R_p$.

FIG. 10A is a graph illustrating the phase, θ, versus Log ω from FIG. 8B, with FIG. 10B illustrating a graph of the numerical derivative of the phase with respect to Log ω, and with FIG. 10C illustrating a graph of the absolute value of dθ/d Log ω. Note that there is one maximum and one minimum (FIG. 10B) in this plot that represent the inflection points of the phase versus Log ω. The symmetric character of the Phase response can be observed clearly in FIG. 10C with the plane of symmetry identified.

Thus, to identify the frequencies where the inflection point in the Phase versus Log ω plots occur, the derivative of the dθ/d Log ω is plotted against Log ω as in FIG. 10B. Here, the derivative dθ/d Log ω (obtained by taking the numerical derivative of the CPE-Randles plot) shows that the inflection points (location of maximum slope) are clearly identified (FIG. 8A) and that the derivative shows the symmetry of the Phase response with frequency. The frequency that represents the plane of symmetry ($\omega_x$) for the dθ/d Log ω vs Log ω plot is defined here as Log $\omega_x$ (See FIGS. 10A-10C). It can be shown that these curves (FIGS. 10B, 10C) are affected by Rs, Rp and Q. Basically, changes in Q shift these curves to the left or right, while changes in Rs and Rp change the distance between the peaks.

It should be noted that the frequencies where the maximum and minimum occur in the derivative correspond to the frequencies where the loss impedance Z" (at the low frequency) and loss admittance A" (at the higher frequency) reach a maximum. In addition, similar plots to FIG. 10C can be obtained from the second derivative of the Log|Z| vs Log ω plots as can be seen in FIG. 11. FIG. 11 is a graph of a comparison of the first derivative of the Phase with Log ω and the second derivative of |Log Z| with Log ω. similar to the plot of FIG. 10C. While the peaks in these two plots are not exactly the same, they are very close to one another. The values in Table 1 were used to generate these plots. The analysis could also be performed using $d^2 \log |Z|/d \log \omega^2$. However, taking the second derivative of the experimental data may introduce large variability that may limit the utility of this approach.

TABLE 1

| | | |
|---|---|---|
| | Q ((Scm$^{-2}$s)$^\alpha$) | 5.00E−05 |
| | Rp (Ωcm$^2$) | 1.00E+06 |
| | Rs (Ωcm$^2$) | 1.00E+02 |
| | α | 8.00E−01 | a) Constant Phase Element—Randles Circuit

For practical purposes, an ideal Randles circuit is usually not suitable for analysis of typical electrode surfaces. Therefore, a similar analysis is needed for a Randles-CPE circuit, where the capacitor is replaced by a CPE element as in the simple circuits described earlier. Two different equations can be developed here. One is the analytical solution for a CPE Randles circuit and the second takes a similar approach to the ideal Randles circuit behavior which can be represented as the sum of the series and parallel R-CPE circuits (Eq. 12), there are two peaks of opposite sign as shown. Both equations are shown for completeness $$\frac{d\theta}{d\text{Log}\omega} = \qquad \text{Eq. 29}$$

$$\frac{-\alpha b}{a^2 + b^2}\left[a - (\omega\tau)^\alpha\left((2R_s + R_p)\cos\alpha\frac{\pi}{2} + 2R_s(\omega\tau)^\alpha\right)\right]2.303\frac{180}{\pi}$$

where $$a = (R_s + R_p) + (2R_s + R_p)(\omega\tau)^\alpha\cos\alpha\frac{\pi}{2} + R_s(\omega\tau)^{2\alpha}, \qquad \text{Eq. 30}$$

$$b = R_p(\omega\tau)^\alpha\sin\alpha\frac{\pi}{2}, \text{ and } \tau^\alpha = R_p Q$$

Or, using the sum of two terms (like Eq. 12)

$$\frac{d\theta}{d\text{Log}\omega} = 2.303\frac{180}{\pi}\left[\frac{\alpha(\tau'\omega)^\alpha\sin\left(\alpha\frac{\pi}{2}\right)}{\left((\tau'\omega)^\alpha + \cos\left(\alpha\frac{\pi}{2}\right)\right)^2 + \sin^2\left(\alpha\frac{\pi}{2}\right)} - \frac{\alpha(\tau_2\omega)^\alpha\sin\left(\alpha\frac{\pi}{2}\right)}{\left((\tau_2\omega)^\alpha + \cos\left(\alpha\frac{\pi}{2}\right)\right)^2 + \sin^2\left(\alpha\frac{\pi}{2}\right)}\right] \qquad \text{Eq. 31}$$

where $\tau' = \left(\frac{\tau_1^\alpha \tau_2^\alpha}{\tau_1^\alpha + \tau_2^\alpha}\right)^{1/\alpha}$, $\tau_1^\alpha = R_s Q$ and $\tau_2^\alpha = R_p Q$ Equation 29 is the analytical form and works for all combinations of $R_s$, $R_p$, Q and α. Equation 31 also holds for all values of $R_s$, $R_p$, Q and α. Both Eq. 31 and 29 are mathematically equivalent in that they calculate identical values at all frequencies and with all values of $R_s$, $R_p$, Q and α.

The characteristic frequencies are defined by $$\omega_1 = \frac{1}{\tau_1} = \frac{1}{(R_s Q)^{1/\alpha}} \text{ and } \omega_2 = \frac{1}{\tau_2} = \frac{1}{(R_p Q)^{1/\alpha}} \qquad \text{Eq. 32}$$

And, as with the ideal Randles circuit, the cross-over frequency, $\omega_x$ can be represented as:

$$\text{Log}\omega_x = \frac{1}{2}(\text{Log}(\omega_1 + \omega_2) + \text{Log}\omega_2) \qquad \text{Eq. 33}$$

or $\omega_2$ can be found from the above for the conditions where $\omega_2 \ll \omega_1$ as:

$$\text{Log }\omega_2 = 2 \text{ Log }\omega_x - \text{Log }\omega_1 \qquad \text{Eq. 34}$$

From the equations and the symmetry they represent in the Log ω domain, one can determine $R_s$ (from the high frequency |Z| response), $\omega_1$ and $\omega_x$ from which $\omega_2$ can be found based only on the higher-frequency portion of the impedance response. In addition, Eq. 13 or 14 allows for determination of α, which is also the slope of the Log|Z| vs Log ω plot in the rising portion. Therefore, the circuit elements ($R_s$, $R_p$, Q, α) can be found from only the high frequency portion of the response, where $R_s$ is |Z| as ω approaches infinity, $\omega_1$ and $\omega_x$ can be found from Eq. 29 or 30 based on the maximum in the phase derivative, and from the cross-over frequency, from which $\omega_2$ can be found using Eq. 32. Then, α can be found from Eq. 14, and $R_p$ and Q can be found from Eq. 32. This analysis only relies on the impedance captured between the high frequency and $\omega_x$. Thus, if the upper frequency range investigated goes from, say 10$^4$ to 10$^0$ Hz, where the lower frequency captures $\omega_x$, then the corresponding symmetric response from 10$^0$ to 10$^{-4}$ Hz can be determined. In fact, if the system exhibits CPE-Randles behavior, the entire frequency range can be determined. This, of course, assumes that no other process arises outside of the frequencies where these processes are observed. Even if the two time constants are close, the expressions can deal with the response.

It is critical that the cross-over frequency, $\omega_x$, and high frequency peak be determined with high precision in the Log scale. At $\omega_x$, the variation of the function over Log ω is very close to linear and therefore a linear extrapolation or interpolation method can be used to find the cross-over frequency. Most of the previous development has focused on the symmetry properties of the phase angle with Log of the frequency. However, similar analyses are possible for the Log|Z| vs Log ω behavior as well. These data, from experiments, will not be as robust and would require taking two numerical derivatives of the data which can introduce large errors from small variations in the measured data. Thus, the focus in this development was on θ.

The following section describes a linear approximation method to estimate $R_p$ from knowledge of $\omega_1$ and $\omega_2$.

b) Linear Approximation Method to Determine Rp

One simple approximation to find $R_p$ is a linear estimate based on the frequencies where the inflection point in the phase angle starts and stops, and the value of Log|Z| at the high frequencies can be used to find $R_p$. Once the frequencies associated with the peaks in dθ/d log ω are determined from the maximums in the dθ/d Log ω plots (e.g., $\omega_1$ for the high frequency and $\omega_2$ for the low frequency), and the high frequency resistance, $R_s$, is measured, $R_p$ can be estimated from a simple linear approximation of the slope of the log |Z| vs Log ω plot. In addition, the slope of the Log|Z| vs Log ω plot during the rise is equal to the negative of the CPE exponent, −α, in the CPE Randles model (see FIG. 12).

The linear approximation is:

$$-\alpha = \frac{\text{Log}|Z_1| - \text{Log}|Z_2|}{\text{Log}\omega_1 - \text{Log}\omega_2} \qquad \text{Eq. 35}$$

$$\text{Log}|Z_2| = \text{Log}|Z_1| + \alpha(\text{Log}\omega_1 - \text{Log}\omega_2)$$

where $Z_2$ is $R_p + R_s$, $Z_1$ is $R_s$.

Thus, with knowledge of the location of the two peak frequencies and the impedance at the high frequency, one can estimate $R_p$, or the low frequency plateau impedance. This is, again, the result of the symmetric response of the derivative of the phase with Log ω in such systems. Indeed, this analysis indicates that if the response of dθ/d Log ω vs Log ω captures the upper frequency spectra to the point where it crosses the axis (i.e., where the phase reaches its maximum), or even close to the symmetry axis, then the remainder of the low frequency response can be predicted (assuming the system behaves as a CPE Randles circuit).

There is an important consequence of this method of analysis to the capture of impedance information from the experiment. That is, the minimum frequency needed for this analysis is $ω_x$, which in this case (FIG. 12) is about 2.5 rad/s. Indeed, knowing how the dθ/d Log ω function behaves close to Log $ω_x$, one may even be able to extrapolate this behavior to find Log $ω_x$. The importance of this result is that the time required to capture impedance response from, say 20,000 Hz, to 2.5 Hz is a few seconds in most impedance analysis systems. Once this is obtained, the remaining low frequency impedances and the ultimate low frequency plateau impedance (i.e., Rp+Rs) can be determined from this information. Usually, the predominant time expended in capturing impedance information comes from the lower frequency measurements, which can take many hours to complete. This approach allows determination of the low frequency response from the first few seconds of data capture of the high frequency impedance, a major savings in time. This can have major implications for a wide range of industries that utilize impedance-based measurements to monitor and assess the performance of electrode systems. This algorithm may make it far more simplified with time savings.

Experimental Verification of the Mathematical Development

To demonstrate the performance of this approach, experimental impedance spectra were generated for a series of experimental conditions. For the CPE-Randles behavior, cobalt-chromium-molybdenum (CoCrMo) alloy surfaces (ASTM F1537[14]) were exposed to two solution conditions. In the first, CoCrMo surfaces were polished to 1 um in $Al_2O_3$ slurry followed by ultrasonic rinse in acetone. The samples were immersed in phosphate buffered saline (PBS, Sigma Aldrich) to which hydrogen peroxide ($H_2O_2$) at 100 mM concentration was added. $H_2O_2$ is a molecule known to be generated during inflammation[15] and is also known to have significant effects on the corrosion behavior of CoCrMo[16-18]. It serves as an excellent electrolyte to demonstrate the CPE-Randles behavior of the alloy-solution interface. A second test condition was performed on a retrieved CoCrMo alloy femoral head from a total hip replacement in PBS alone as this is a more-typical combination for testing the impedance of a metallic biomaterial surface. Finally, a test of CoCrMo flat polished sample surface in PBS was performed to investigate the effects of large separations in Log of the characteristic frequencies (i.e., large differences in Rs and Rp to show how such conditions can be analyzed using sbEIS and what possible limitations may be present in such analyses of actual data.

In each test, EIS spectra were captured after establishing Open Circuit Potential (OCP) for 1 h of immersion in electrolyte. The EIS spectra was captured from $10^5$ Hz to $10^{-2}$ or 1 Hz with a 10 mV AC voltage signal. For each test, the number of impedance data points per decade was at least 10 spaced evenly on a log scale. From the |Z| and θ response, the phase derivative of the data was determined numerically (i.e., dθ/d Log ω=$(θ_{i+1}-θ_i)/(\log ω_{i+1}-\log ω_i)$), and the log ω for the result was found as the average of the two log ω values. In some cases, a 3-point or 5 point running average method was applied to the θ vs log ω data prior to the numerical derivative. Eq. 29 was then used to fit the experimentally obtained dθ/d Log ω function by finding the best characteristic frequencies ($ω_1$ and $ω_2$, and/or $ω_x$). In addition, adjustment was made to fit the height of the function using Eq. 12. Once $ω_1$, $ω_2$, and α were determined, $R_s$ was obtained from |Z| at ω=$10^5$ Hz. Thus, with α, $R_s$, $ω_1$ and $ω_2$, the remaining factors ($R_p$ and Q) were determined from Eq. 32.

To explore sbEIS and its comparison to CNLS fitting approaches, and to investigate how sbEIS works when the two characteristic frequencies are far apart on the Log frequency plot, the third test, of CoCrMo in PBS, was analyzed in several ways to make comparisons between CNLS and sbEIS approaches. First, the complete frequency range ($10^5$ Hz to $10^{-3}$ Hz) was captured and used to determine the CPE-Randles circuit parameters using the CNLS fitting with the Calc-Modulus weighting in ZView® (i.e., standard method). Then, the data were censored to only include the response from $10^5$ to $10^{-1}$ Hz and the data were again fit with CNLS program in ZView® where several different weighting factors were applied including Calc-Modulus, Data-Modulus, Calc-Proportional, Data-Proportional, Calc-Special, and Data-Special weighting and unit weighting. Each weighting approach emphasizes the data in different ways to attempt to improve the fit and minimize the error in determining each circuit parameter. These analyses were performed to show how a limited frequency data set containing only the higher frequency range affects the analyses using each CNLS weighting approach. In particular, the Rp for each fitting was compared to the full data set fit. Finally, the sbEIS fit of the data set (from $10^5$ to $10^{-1}$ Hz) was determined for comparison using the described analysis method. In addition, the circuit parameters from the full-frequency CNLS fit were used to plot the phase derivative versus Log frequency to compare with the experimental data and to show the link between the peak frequencies, $ω_1$ and $ω_x$ and the circuit values. In addition, this test helps to understand how the sbEIS approach can work with widely separated time constants and what potential errors may arise in the sbEIS analysis due to noise and other effects.

Results

CPE-Randles Response for CoCrMo in $H_2O_2$/PBS

The results for testing of CoCrMo in 100 mM $H_2O_2$ in PBS are shown in FIGS. 13A-13F along with the analytical functions describing the CPE-Randles behavior using the parameters found using the aforementioned symmetry-based EIS analysis method. Phase derivative (FIG. 13A), Bode diagrams (FIGS. 13B and 13C), the loss impedance (Z", FIG. 13D), tag, (FIG. 13E) and Nyquist plot (-Z" vs Z, FIG. 13F) are presented to showcase good agreement between analytical and experimental data. The characteristic frequencies were measured as Log $ω_1$=3.9, Rs=298 Ωcm² and α=0.907 (determined from the height of the phase derivative plot at the characteristic frequency). The cross-over frequency was determined from the phase derivative plot to be Log $ω_x$=2.015, which resulted in Log $ω_2$ to be 0.13. From $ω_2$, the $R_p$ was determined (783 kΩcm²). The goodness of fit of the parameters to the experimental data is evident in these plots. Table 2 summarizes the CPE-Randles circuit parameters obtained from an EIS analyzing software (ZView®, Scribner Associates Inc) and from the new analysis (sbEIS) method. It is interesting to note that using only information up to the cross-over frequency ($ω_x$) and higher, the polarization resistance of the circuit was determined to be within 5% when calculated using a CNLS method.

TABLE 2

Comparison of parameters for FIG. 13 data determined by symmetry-based EIS versus standard ZView ® CNLS fitting.

| | sbEIS | ZView ® |
|---|---|---|
| Q ((Scm$^{-2}$s)$^\alpha$) | 9.73E-07 | 9.74E-07 |
| Rp (Ωcm$^2$) | 783381 | 753800 |
| Rs (Ωcm$^2$) | 298 | 298 |
| α | 0.907 | 0.906 |

CPE-Randles Response for a Retrieved CoCrMo Femoral Head in PBS

The results for testing of CoCrMo femoral head in PBS are shown in FIGS. 14A-14D along with the analytical functions describing the CPE-Randles behavior using the parameters found using the symmetry-based EIS analysis method. Phase derivative (FIG. 14A), Bode diagrams (FIGS. 14B and 14C) and tag, (FIG. 14D) are presented. Good agreement between analytical and experimental data can be observed from these plots. The characteristic frequencies were measured as Log $\omega_1$=3.08, Rs=6.97 Ωcm$^2$ and α=0.955 (determined from the height of the phase derivative plot at the characteristic frequency). The cross-over frequency was determined from the phase derivative plot to be Log $\omega_x$=−0.7, which resulted in Log $\omega_2$ to be −4.48. From $\omega_2$, the $R_p$ was determined. The goodness of fit of the parameters to the experimental data is evident in these plots. Table 3 summarizes the CPE-Randles circuit parameters obtained from an EIS analyzing software (ZView®, Scribner Associates Inc) and from the new analysis (sbEIS) method.

TABLE 3

Comparison of parameters for FIG. 14 determined by symmetry-based EIS versus standard ZView ® CNLS fitting.

| | sbEIS | ZView ® |
|---|---|---|
| Q ((Scm$^{-2}$s)$^\alpha$) | 9.40E-05 | 9.38E-05 |
| Rp (Ωcm$^2$) | 5.86E+06 | 6.51E+06 |
| Rs (Ωcm$^2$) | 6.97 | 7.07 |
| α | 0.955 | 0.953 | sbEIS Versus CNLS and Widely-Separated Phase Derivative Peaks

The impedance response (Bode Diagrams) of a CoCrMo alloy surface in PBS (FIGS. 15A and 15B) captured from 10$^5$ to 10$^{-3}$ Hz show clear CPE-Randles behavior and the CPE Randles fitting functions are also shown. These were fit using ZView® with the Calc-Modulus weighting, where the error is normalized to the magnitude of the calculated function value. This approach results in an excellent fit for all parameters (see Table 4) with low percent error demonstrating the merit of the CNLS fitting for this data range. This result establishes the baseline behavior from which additional analyses can be made. If these impedance data are censored such that only data down to 0.1 Hz is used (captured) for fitting (instead of down to 10$^{-3}$ Hz), it can be seen that when such a limited frequency range of data is fit using CNLS with any of the weighting methods present in ZView®, the fits are especially poor for Rp, with errors ranging as high as 699% (See Table 4). Only the unit weighting method in ZView® obtains Rp close to the full frequency fit. However, the unit weighing method led to a poor fit with high frequency phase and impedance data. Thus, none of the available weighting methods in ZView® capture the impedance response well when only data up to 0.1 Hz is captured and used to obtain circuit parameters.

TABLE 4

Circuit elements determined by CNLS in ZView ® using the full frequency range (down to 0.001 Hz), and only down to 0.1 Hz. All of the different weighting function approaches in ZView ® are shown, along with the % error in Rp.

| Low Frequency (Hz) | Weighting | Rp | Rp Error % | Rs | Q | Alpha |
|---|---|---|---|---|---|---|
| 0.001 | Calc-Modulus | 2.00E+07 | 1.3 | 76.54 | 3.87E-06 | 0.925 |
| 0.1 | Calc-Modulus | 2.92E+08 | 659.3 | 76.48 | 3.90E-06 | 0.923 |
| 0.1 | Data-Modulus | 3.06E+08 | 699.3 | 76.43 | 3.90E-06 | 0.923 |
| 0.1 | Calc-Proportional | 2.49E+08 | 391.0 | 76.38 | 3.89E-06 | 0.923 |
| 0.1 | Data-Proportional | 6.89E+07 | 106.6 | 77.27 | 3.81E-06 | 0.926 |
| 0.1 | Calc-Special | 1.77E+08 | 343.6 | 76.63 | 3.90E-06 | 0.926 |
| 0.1 | Data-Special | 1.87E+08 | 370.2 | 76.57 | 3.90E-06 | 0.926 |
| 0.1 | Unit Weighting | 1.29E+07 | 7.6 | 166.3 | 3.83E-06 | 0.935 |
| 0.1 | sbEIS | 1.76E+07 | | 75.1 | 4.16E-06 | 0.925 |

The sbEIS analysis of the data only requires capturing the phase derivative peak height (to determine a), the peak frequency (Log $\omega_1$) and the cross-over frequency (Log $\omega_x$) which come from a plot of the phase derivative versus Log ω. FIG. 16A shows the phase derivative versus Log frequency plot for the original data in FIG. 12 (down to 0.001 Hz) and the analytical equation (Eq. 31) of the data based on the circuit parameters obtained from the CNLS fit of the entire frequency range. The peaks, $\omega_1$, and the cross-over frequency, $\omega_x$, are clearly shown in FIG. 16A. The excellent fit between experiment and the phase derivative equation can be seen. FIG. 16B is an enlarged view showing how the raw data, a 5-point running average of the data, and the analytical function behave at the crossover frequency. The close correspondence of the analytical equation and the data at $\omega_x$ show that sbEIS captures the same information as the full CNLS fit and calculates circuit parameters very close to the full fit CNLS. In addition, the sbEIS approach does not require capturing information to 0.001 Hz, but only to sufficiently capture $\omega_x$ (at about 1 Hz). Clearly, the quality of the fit using sbEIS depends on the quality of the data used to find $\omega_1$ and $\omega_x$. From FIG. 16B, it is clear that there is a range of possible variations in the choice of $\omega_x$ based on the data that would introduce error. In this case, $\omega_x$=0.887 rad/s which resulted in Rp of 2×10$^7$Ω. Shifting Log $\omega_x$ to 0.787 increased Rp to 3×10$^7$Ω, while increasing it to 0.987 resulted in Rp of 1.3×10$^7$Ω.

Electrochemical Impedance Spectroscopy is a well-established method to study the behavior of electrode materials of interest. While most of the research has focused on improving the existing algorithms[19] or introducing new approaches[20,21] to solve complex nonlinear least square problems, graphical analysis of EIS results has been performed before[22,23]. Lemaitre et al.[24] used geometric functions to calculate charge transfer resistance using semicircular Nyquist plot. Schwake et al.[25] used trigonometric functions to do the same. Morales et al.[26,27] used derivative of the tangent of phase angle to allow for discrimination between the number of processes in the captured impedance spectra. Huang et al.[28] formulated a two-step procedure for graphical analysis for EIS data. The authors used frequency derivative of phase angle to identify electrochemical processes and then performed graphical analysis to obtain parameter distribution to provide reasonable initial values for CNLS fitting algorithms. Although these efforts involved mathematical and graphical analysis of the impedance spectra, none showed how these approaches can be used for simplified methods of analysis and to simply interpret the parameters of the circuit from the properties of these functions, nor did they show how the symmetry of these functions can be exploited.

The method of analysis presented here does not require the use of the typical CNLS approach and relies on the characteristic frequencies and the derivative of the phase with respect to $\text{Log}_\omega$ to analyze the circuit. The approach involves analysis of the phase angle and its derivative's symmetry and Log of the impedance magnitude behavior (Log|Z|) with Log of the frequency (Log $\omega$, in rad/s) of such circuits as a tool to find equivalent circuit parameters associated with the low frequency behavior (e.g., polarization resistance) from only the high frequency response. This method relies on the properties of ideal and non-ideal RC circuits and the combination of the Log|Z| and $\theta$ versus Log $\omega$ behavior to allow for determination of the parameters of the circuit. In particular, the symmetry in the phase angle and its derivative vs Log $\omega$ response and the properties of the phase derivative function (peak height, characteristic frequency and cross-over frequency) that is exploited in this work. As a result, the experimental data does not require the entire frequency range (especially in the low frequency region) to determine the behavior, yet the symmetry properties allow for determination of the low frequency response (i.e., $R_p$). So, the lower frequency response can be predicted using only the higher frequency spectra and the symmetry in the phase derivative.

That determination of the low frequency response can be made from the high frequency information may, at first, appear to violate some physical principles. However, it does not. In fact, the polarization resistance, Rp and interfacial capacitance, C (or Q), of the electrode affect the cross-over frequency, and with the knowledge that the impedance response is symmetrical across Log of the frequency for such Randles circuits provides additional information needed to determine the low frequency response. This is not an aliasing effect or a folding of the signal, but the property of the circuit elements.

FIGS. 13A-13F (Table 2) shows a direct comparison between the results from current approach vs the conventional CNLS methods used by a commercial EIS software (ZView®). Hydrogen peroxide was added to simulate inflammation which reduced the polarization resistance and allowed for a direct comparison between the two methods. Table 2 shows that the $R_p$ obtained using sbEIS was within 4% of $R_p$ using ZView®. The other parameters were within 1% of each other (sbEIS vs ZView®). Using sbEIS, $\omega_x$ and $\omega_2$ were found to be 2.1 and 0.13 respectively. Hence, the sbEIS needed data only between $10^5$ and $10^2$ Hz and the lower half of the spectra was predicted based on the symmetry. However, to be able to use ZView®, the data had to be collected from $10^5$ Hz to 1.3 Hz. In terms of time required for measurement, this translates into 8 secs (for sbEIS) vs 32 secs (for ZView®) of data captured to successfully predict $R_p$. Although, this does not seem like substantial savings in time, for a more realistic scenario for measuring $R_p$, for example, for retrieved implants (e.g., femoral head and neck), or other tests of alloy impedance, the average (n=23) $\omega_x$ and $\omega_2$ were found to be −0.81 and −3.43 respectively[29]. This translates into 120 secs (for sbEIS) vs 12 h (ZView®) of data required for successfully predicting Rp.

When there is a large frequency spread between the first and second peaks in the phase derivative, as in FIGS. 15A and 15B, this analysis can calculate the low frequency peak in the Log frequency, Log($\omega_2$), as long as the two other characteristic frequencies (Log $\omega_1$ and Log $\omega_x$) are accurately determined. Then, the parameters of the circuit can be found from the time constants, $R_s$ and measurement of alpha from the phase derivative peak height. Of course, this is critically dependent on accurate determination of Log $\omega_1$ and Log $\omega_x$ and this depends on the experimental system and quality of the EIS system used to obtain the data. Small errors in determination of $\omega_x$, which depends on accurately capturing where the phase derivative crosses zero, may lead to shifts in Rp (as discussed above), so sbEIS has some susceptibility to error based on the quality of the data obtained.

As the separation between the two peaks increases, (e.g., Rp increases), the slope of the phase derivative at the cross-over frequency becomes smaller and smaller and this can make accurate determination of $\omega_x$ more challenging. For example, FIG. 17 shows the analytical phase derivative equation for an ideal Randles circuit for the case where Rp and Rs are $10^8$ away from one another (i.e., separated by Log $\omega$=8). Also shown is the phase derivative for the series RC circuit (i.e., where Rp is effectively infinite). These plots show that the Randles phase derivative crosses zero, while the series RC phase derivative does not. It is clear, however, that the slope of the Randles circuit is very small and noise in this function may make distinguishing between these two condition more challenging as the peak separation increases. Increasing the range of data capture to frequencies well below $\omega_x$ may increase the ability to determine $\omega_x$ under these conditions.

The CNLS fitting with the weighting algorithms (at least the ones provided in ZView®) are not as capable of determining the circuit element values, particularly Rp (see Table 4), from only the higher frequency responses (down to just below the cross-over frequency). However, when the full, or near-full frequency, response is present, CNLS fitting can accurately define the circuit parameters.

Because of the substantial time savings (vs traditional EIS analysis), the current approach may allow for near-continuous monitoring of polarization resistance with only a few seconds of data capture required and opens up the possibility of numerous sensor applications across a range of disciplines including corrosion, battery technology, and bioelectrochemical fields. Low-powered wireless sensors currently struggle to capture data across a large spectrum of frequencies and sensors based on the current approach can incorporate this short-time analysis method. With this new approach, one can extend the range of frequencies that can be assessed by current conventional sensors. The short analysis time can also make this approach ideal for intraoperative assessment of implant corrosion and severity of damage during orthopedic revision surgeries[29] or may allow for smart sensor methods to be applied to medical devices based on impedance.

The current work is focused on measurements and applications in the field of material degradation/corrosion, however, the approach is applicable to other Transfer Function analysis that include dielectric relaxation, complex modulus, and others where phase angles and complex variables are present. For example, complex modulus obtained from dynamic mechanical analyses has similar real and imaginary responses, with phase angles and all of the same mathematical construct associated. These techniques may be suitable for such experimental analyses as well.

More complex interfacial models like coated circuit model, and more complex impedance responses can be analyzed using similar concepts. In these cases, the circuit behavior will be comprised of pairs of phase derivative symmetry functions summed together for most cases. Thus, the derivative of the phase for such electrodes will show pairs of symmetric functions that can be used to interpret the more complex response. Work on these models is continuing.

In addition to the above, the approach described also shifts reliance on computer software for generating EIS parameters to providing a better link between the circuit parameters and the overall functional description of the electrode interface (i.e., direct interpretation of the shape of Bode plots, etc.). Another advantage of this approach is that it can be employed easily with commonly available spreadsheet calculation software like Microsoft® Excel and does not depend on CNLS software for fitting and interpretation of the response.

There are several potential limitations/pitfalls of this approach that need to be carefully assessed. First, the analysis is performed in the Log|Z| vs Log $\omega$ format and while the error in Log|Z| that results from this approach is small, the error is amplified in the non-Log scale for |Z|, so care should be taken in evaluating the behavior. This method cannot deal with circuit behavior where the response from a portion of the circuit is completely outside of the frequency range tested. In addition, the frequency range captured needs to reach down to the lowest cross-over frequency or very near to it so that accurate extrapolation to the cross-over frequency can be obtained. Noise in the electrochemical data (particularly $\theta$) at high frequency may significantly affect the ability to take a numerical derivative of the data to find the Phase vs Log $\omega$ behavior. This may make determination of the exact locations of the peak frequency (Log $\omega_1$) and the cross-over frequency (Log $\omega_x$) more susceptible to this noise. Fortunately, the phase response for most systems is a relatively stable function of Log $\omega$. Possible smoothing algorithms (e.g., running average approaches) may be needed for the high frequency data in these cases. Sufficient sampling across the frequency range is necessary to accurately capture the various frequencies needed for the calculation. A good estimate is about 10 samples per decade of frequency. In addition, since the analysis relies on symmetry across the Log of the frequency, small errors in the Log x can result in larger differences in x. For example, for example a 4% change in Log(x) will result in about a 10% change in x, thus, small errors in Log of the frequency are amplified when these are converted into frequencies. This may impact the calculations of Q and Rp since they rely on the characteristic frequencies, not the Log of these frequencies.

An alternative approach that relies on symmetry (sbEIS) for analyzing CPE-Randles circuits was presented and assessed experimentally. A significant element of sbEIS is that it allows for the determination of the low frequency impedance response based only on the high frequency information. This analysis is based on the fundamental observation that the phase angle behavior and its derivative with Log $\omega$ is symmetric over the Log $\omega$ range. This symmetry means that once the high frequency spectra (down to the maximum phase angle or cross-over frequency) is known, the remainder of the low frequency behavior can be determined. In addition, it has been shown that the $d\theta/d$ Log $\omega$ vs Log $\omega$ behavior can be accurately represented by a matched (symmetric) pair of Cauchy-Lorentz like functions which can be used to reconstitute the impedance and phase behavior. Both Randles and CPE-Randles behavior can be analyzed with this approach to accurately determine circuit elements without the use of CNLS approaches. These analysis methods can be adopted to new impedance test methods focused on capturing the phase response at high frequency to provide the upper half behavior in sufficient detail to describe the overall behavior with relatively high accuracy. Experimental methods (e.g., high sampling rate at high frequency) may improve the accuracy of the analysis.

One additional parameter is needed for this analysis that is the constant phase element exponent, $\alpha$. This value can be experimentally determined from a plot of the slope of the d Log|Z| vs Log $\omega$ plot (see FIG. 18 below) and can be determined by a numerical derivative of the data. Specifically, FIG. 18 is a graph of a plot of d Log|Z|/d Log $\omega$ vs Log $\omega$ to show how to obtain $\alpha$ from the experimental (measured) data.

There is an important consequence of the presently disclosed method of analysis to the capture of impedance information from the experiment (measurements). If one can assume that CPE-Randles behavior is expected, then only the impedance information from the high-frequency half of the response is needed to find the entire response. That is, the minimum frequency needed for this analysis is Log $\omega_x$, which in this case is about 2.5 Hz. Indeed, knowing how the $d\theta/d$ Log $\omega$ function behaves close to Log $\omega_x$, one may even be able to extrapolate this behavior to find Log $\omega_x$.

The importance of this result is that the time required to capture impedance response from, say 20,000 Hz, to 2.5 Hz is a few seconds in most impedance analysis systems. Once this is obtained, the remaining low frequency impedances and the ultimate low frequency plateau impedance (i.e., Rp+Rs) can be determined from this information. Usually, the predominant time expended in capturing impedance information comes from the lower frequency measurements, which can take many hours to complete. This approach allows determination of the low frequency response from the first few seconds of data capture of the high frequency impedance, a major savings in time. This can have major implications for a wide range of industries that utilize impedance-based measurements to monitor and assess the performance of electrode systems. This presently disclosed methodology may make it far more simplified and time saving.

CPE-Coating Models

The above approach of using the symmetry properties of the CPE-Randles circuit model to take the high frequency response to determine the low frequency response can also be adapted to more complex models of behavior including the typical models used for assessing coatings and other electrode responses that have multiple time-constant behavior associated with the response. These effects and the analysis approach for these more complex models is further described herein.

In this example, one of the typical coating models used for impedance analysis is developed. In particular, FIG. 19 represents a schematic of a coating model typically used in impedance analysis of more complex systems, where the Cs are replaced with constant phase elements, each with their own exponents for a more generalized analysis. The equations for an ideal R-C coating model circuit are also shown below:

$$Z = R_s + \frac{e(a^2 + b^2w^2)}{e^2 + D^2} - j\frac{D(a^2 + b^2w^2)}{e^2 + D^2}$$
$$\tau_2 = R_2C_2$$
$$a = R_2 + R_1(1 + \omega^2\tau_2^2)$$
$$b = \tau_2 R_2$$
$$D = \omega b(1 + \omega^2\tau_2^2) + \omega C_1(a^2 + b^2\omega^2)$$
$$e = a(1 + \omega^2\tau_2^2)$$

Table 5 shows parameters as used in such coating model example:

TABLE 5

Idealized 2-circuit Coating model

| | |
|---|---|
| α1 | 1 |
| α2 | 0.8 |
| Rs | 1.00E+02 |
| R1 | 1.00E+03 |
| C1 | 1.00E−04 |
| R2 | 1.00E+06 |
| C2 | 1.00E−03 |
| t2 | 1000 |
| b | 1000000000 |

The above exemplary CPE-based model, using the parameters of Table 5, results in the respective impedance and phase Bode plots of FIGS. 20A and 20B, respectively.

Note that this model has two time constants that result in a more complex phase behavior and an intermediate plateau impedance. In addition, the low frequency impedance has not been reached in this model even after 0.0001 Hz.

The approach taken here is similar to that used for the CPE-Randles analysis, except that there are two time constant processes that need to be included (i.e., two pairs of peak symmetric functions). To do this, matched pairs of peak functions (Eq. 12 or 21) are generated for each time constant present. Each peak function pair will be anti-symmetric, and each will be centered at frequencies that best fit the data. The resulting dθ/d Log ω vs Log ω plot is the sum of each function pair superimposed on each other as shown in FIG. 21 with Table 6 showing the parameters of the two pairs of C-L functions used to fit the data. In other words, FIG. 21 is a further analysis of two sets of anti-symmetric peak function pairs used to fit the dθ/d Log ω vs Log ω plots, with Table 6 showing the parameters of the two pairs of C-L functions used to fit the data.

TABLE 6

Function parameters used to fit two pairs of symmetric functions for the two peak pairs of the Coated model (see FIG. 12). The circuit elements giving rise to each time constant is shown along with the Log10ω value. The pairs are t1 and t2, and t3 and t4.

| Time Constants | RC | s | Log(1/s) |
|---|---|---|---|
| t1 | RsC1 | 0.001 | 3.00 |
| t2 | (Rs + R1)C1 | 0.011 | 1.959 |
| t3 | (R1 + R2)C2 | 0.55 | 0.2596 |
| t4 | (Rs + R1 + R2)C2 | 5000.55 | −3.6990 |

The fitting functions are identical to the overall phase derivative response (obtained numerically from the plotted functions). Using fitting functions of the form of Eq. 22 will reproduce more complex phase derivative functions and from these the parameter values can be obtained.

The linear approach described in the previous section could be applied piecewise for each interval of impedance once the characteristic frequencies are determined. Using the same approach as in the CPE-Randles section and knowing the high frequency impedance, first, the intermediate plateau can be determined using Eq. 27, and then, once this impedance is known, the low frequency impedance can also be determined.

Application of the CPE-Randles pair-wise functions is more involved but can similarly be used to reconstruct the derivative of the phase and fit its response (using the CPE exponents as well.)

Comments of the Analysis Approach

The approach described here relies on the symmetry behavior of the derivative of the phase with Log ω, or the second derivative of Log Z with Log ω. This symmetry can be accurately modeled using the pair-wise functions developed, even when there are multiple time-constant processes which are overlapping across frequencies.

Integral Approach to Find Log|Z| from θ Vs Log ω Plots

One observation from these analyses is that the shape of the θ vs Log ω plots is very similar to the d Log|Z|/d Log ω vs Log ω plots. That is, if one were to integrate θ from a starting Log ω (e.g., infinity), to some value, Log ω, then Log|Z| could be approximated from this integral by:

$$LogZ(\omega) = $$

$$LogZ(\infty) + \int_{\infty}^{Log_{10}\omega} \frac{dLog|Z|}{dLog\omega} dLog\omega \approx LogZ(\infty) + k \int_{\infty}^{Log_{10}\omega} \theta dLog\omega$$

Eq. 36 where k is a constant that converts from θ to Log Z, and α is, in fact, the negative of the slope of the Log|Z| vs Log ω plot (a, the CPE exponent) divided by peak phase angle.

For an ideal circuit (α=1), this ratio of 1/90=0.0112 and is nearly constant over the range of 0.7<α<1.

To demonstrate this equivalence, the Randles Circuit constant phase element model from FIG. 7A is used. FIG. 22A plots both the d Log|Z|/d Log ω vs Log ω and phase angle in degrees vs Log ω on the same plot, obtained per the original Randles Circuit constant phase element model from FIG. 7A. FIG. 22B shows the original Log|Z| vs Log ω relative to the subject matter of FIG. 22A and the respective results from integrations thereof using both forms of Eq. 36. The factor k used in such subject matter is obtained from the ratio of the max d Log Z/d Log ω (0.71) to the Phase (70.9), k=0.01122, Log Z∞ is just the high frequency impedance (Log Rs).

While there are small differences in the shape of the theta and the d Log Z/d Log ω curves, their integrals are very similar. This approach is particularly attractive if only a partial (high frequency) impedance is available and can be combined with the Cauchy-Lorentz functions to restore the Log Z vs Log ω plots. This can be done by first integrating the C-L functions over Log w to reconstitute theta vs Log ω. Then the integral of the above approach can be applied to the entire frequency range to obtain the entire behavior.

This integral approach may also be useful for determining the entire frequency response for more complex model behavior (e.g., coated models). Here, again, incomplete knowledge of the frequency range of response can be used to reconstitute the entire range of interest using the C-L functions, and then integration of these functions with the appropriate scaling factors can generate the Log Z vs Log ω response.

Limitations of the Method

There are several potential limitations/pitfalls of this approach that need to be carefully assessed. First, the analysis is performed in the Log|Z| vs Log ω format and while the error in Log|Z| that results from this approach is small, the error observed in the |Z| can be significantly larger, so care should be taken in evaluating the behavior. The presently disclosed method cannot deal with circuit behavior where the response from a portion of the circuit is completely outside of the frequency range tested. In addition, the frequency range captured needs to reach down to the cross-over frequency or very near to it so that accurate extrapolation to the cross-over frequency can be obtained.

Noise in the electrochemical data at high frequency may significantly affect the ability to take a numerical derivative of the data to find the Phase vs Log ω behavior. Possible smoothing algorithms (e.g., running average approaches) may be needed for the high frequency data in these cases.

Sufficient sampling across the frequency range is necessary to accurately capture the various frequencies needed for the calculation. A good estimate is about 10 samples per decade of frequency (more is better).

Experimental Verification of the Approach

To demonstrate the performance of this approach, experimental impedance spectra were generated for a series of experimental conditions. These tests were performed to allow for determination of the impedance from the upper half of the frequency range for comparison with the full spectrum. In addition, experiments were conducted which generated a two-time constant phase response (e.g., coated model response).

Randles CPE Response Example

In this experiment, a CoCrMo alloy surface, polished in 0.05 μm finish at 9 mm² area was immersed in Phosphate Buffered Saline (PBS) modified with 100 mM $H_2O_2$ added to increase the oxidizing strength of the electrolyte and reduce the resistivity of the oxide film. The sample was allowed to equilibrate to a stable OCP and its impedance was captured from $10^5$ Hz to 0.01 Hz with 12 data points per decade of frequency. Both |Z| and θ were captured. In addition, the impedance tests were repeated with the lower limit frequency at 1 Hz. This latter set of data were used to make an estimate of the impedance response using the analysis methods described above.

Three approaches are demonstrated: Approach 1. The use of the linear extrapolation based on the cross-over frequency determination (Eqs. 3 and 4). Approach 2. The integration of the θ vs Log ω function (Eq. 36) and the double integration of the Cauchy-Lorentz fitting functions obtained from the best fit of the CL functions to the measured data (dθ/d Log ω).

Figure 14A:
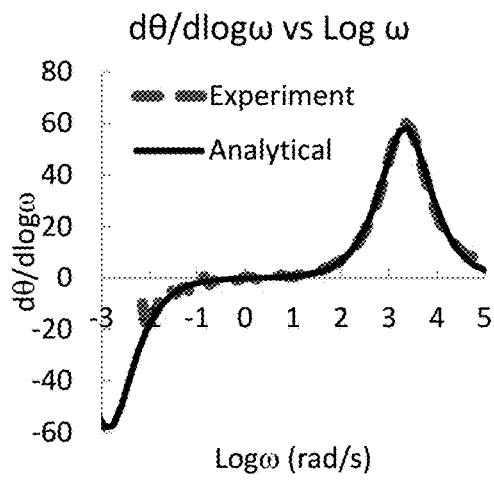
Figure 14B:
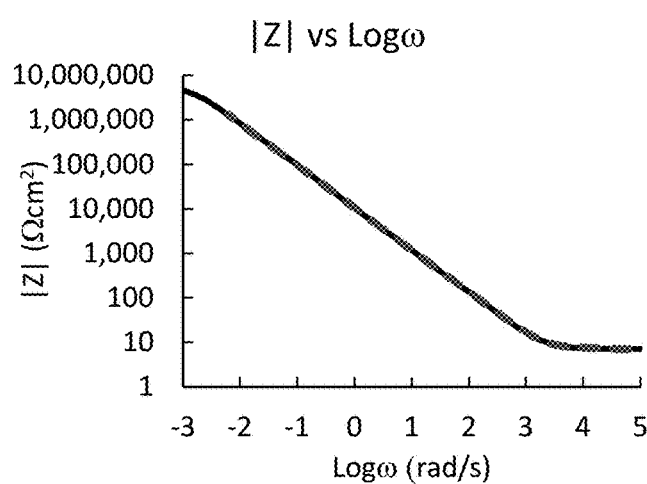
Figure 14C:
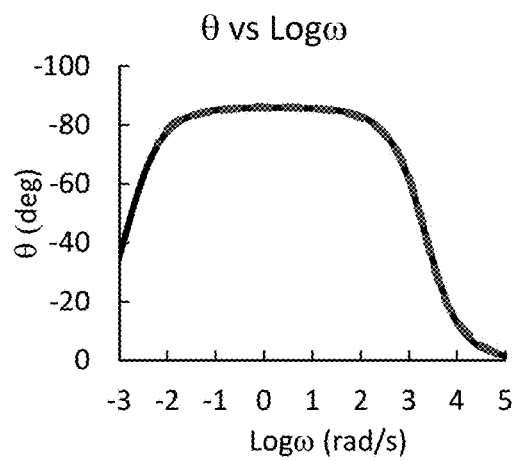
Figure 14D:
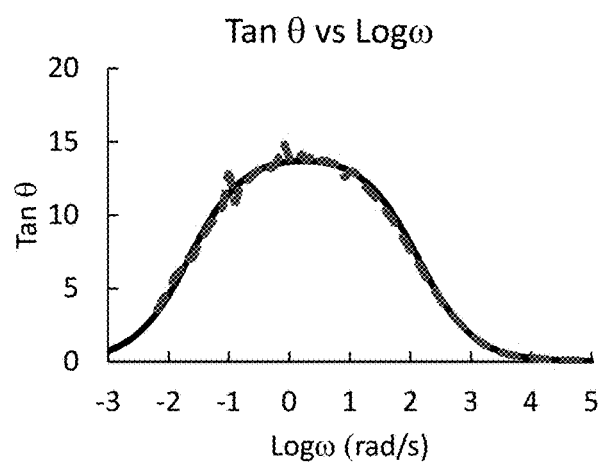

The experimental data from this test, FIGS. 23A and 23B show, respectively, Log|Z| and phase angle theta (θ) vs Log ω, d θ/d Log ω and d Log Z/d Log ω. In FIG. 14A, the Log|Z| response for each approach and the original data are shown. The linear approach used the peak Log frequencies, the high one obtained from the peak of the dθ/d Log ω plot (3.3) and the low obtain from finding the cross-over frequency and Eq. 4. (Log ωx=0). From Eq. 3, using the d Log|Z| vs d Log ω maximum to find a (0.89) resulted in the low frequency Log|Z| of 5.323 (211 kΩ).

The second approach, integrating the phase over the Log ω generated an excellent fit over the range of frequencies. However, this approach can only go over the range of frequencies measured and thus limits the ability to predict the low frequency response. Approach 2 is to use Eq. 36 of 0 over Log ω using k=0.01122 and Log|Z∞| of 2.17, which resulted in the gray plot in FIG. 21. This results in a Log|Z| at 1 Hz of 5.187 (153 kΩ).

Approach 3, using the CL functions (FIG. 23C) allows determination over the entire frequency range. The Cauchy-Lorentz (CL) functions were determined by finding the function with the least squares error to the numerical derivative of the Phase vs Log ω data (Shown in FIG. 23C). The integration of the CL functions resulting in the phase plot (FIG. 23B). This approach led to a lower plateau Log|Z| of 5.4 (348 kΩ). Testing this same sample down to 0.01 Hz resulted in a plateau Log|Z| of 5.66 (450 kΩ). FIG. 23D charts d Log|Z|/d Log ω versus Log ω.

The above analysis and examples have laid out an approach for analyzing the low frequency impedance response based on the high frequency information. This analysis is based on the fundamental observation that the phase angle behavior and its derivative with Log w is symmetrical over the Log w range. This symmetry means that once the low frequency impedance (up to a maximum phase angle) is known, the remainder of the behavior can be determined. In addition, it has been shown that the dθ/d Log ω vs Log ω behavior can be accurately represented by a matched (symmetric) pair of Cauchy-Lorentz (CL) functions which can be used to reconstitute the impedance and phase behavior. Such function pairs can be used for more complex impedance behavior (e.g., coated surface models).

These analysis methods can be adopted to new impedance test methods focused on capturing the phase response at high frequency to capture the upper half behavior in sufficient detail to describe the overall behavior. Experimental methods (e.g., high sampling rate at high frequency) may improve the accuracy of the analysis.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

NUMBERED REFERENCES

1. J. R. Macdonald, *Solid State Ion.*, 176, 1961-1969 (2005).
2. R. Macdonald and E. Barsoukov, *Impedance Spectroscopy: Theory, Experiment, and Applications*, 2nd Edition.
3. M. Orazem and B. A. Tribollet, *Electrochemical Impedance Spectroscopy*, 2nd Edition.
4. M. Haeri, S. Goldberg, and J. L. Gilbert, *Corros. Sci.*, 53, 582-588 (2011).
5. M. T. Ehrensberger and J. L. Gilbert, *J. Biomed. Mater. Res. B Appl. Biomater.*, 93B, 106-112 (2010).
6. Gamry User Manual
7. K. Levenberg, *Q. Appl. Math.*, 2, 164-168 (1944).
8. D. Marquardt, *J. Soc. Ind. Appl. Math.*, 11, 431-441 (1963).
9. J. R. Macdonald and J. A. Garber, *J. Electrochem. Soc.*, 124, 1022-1030 (1977).
10. J. R. Macdonald and L. D. Potter, *Solid State Ion.*, 24, 61-79 (1987).
11. B. A. Boukamp, *Solid State Ion.*, 18-19, 136-140 (1986).
12. B. A. Boukamp, *Solid State Ion.*, 20, 31-44 (1986).
13. J. Lin, thesis, (2016).
14. F04 Committee, *Specification for Wrought Cobalt-28Chromium-6Molybdenum Alloys for Surgical Implants* (UNS R31537, UNS R31538, and UNS R31539), ASTM International.
15. G. M. Rosen, S. Pou, C. L. Ramos, M. S. Cohen, and B. E. Britigan, *FASEB J.*, 9, 200-209 (1995).
16. Y. Liu and J. L. Gilbert, *Wear*, 390-391, 302-311 (2017).
17. Y. Liu and J. L. Gilbert, *J. Biomed. Mater. Res. B Appl. Biomater.*, 106, 209-220 (2018).
18. Y. Liu, thesis, (2017).
19. B. A. Boukamp, *J. Electrochem. Soc.*, 142, 1885-1894 (1995).
20. M. ic, *J. Electroanal. Chem.*, 760, 85-96 (2016).
21. P. Zoltowski, *Solid State Ion.*, 176, 1979-1986 (2005).
22. M. E. Orazem, N. Pébère, and B. Tribollet, *J. Electrochem. Soc.*, 153, B129-B136 (2006).
23. Y. X. He and Y. G. Dong, *Appl. Mech. Mater.* (2013).
24. L. Lemaitre, M. Moors, and A. P. Van Peteghem, *J. Appl. Electrochem.*, 13, 803-806 (1983).
25. A. Schwake, H. Geuking, and K. Cammann, *Electroanalysis*, 10, 1026-1029 (1998).
26. J. C. Ruiz-Morales, D. Marrero-López, J. Canales-Vazquez, P. Núñez, and J. T. S. Irvine, *Solid State Ion.*, 176, 2011-2022 (2005).
27. J. C. Ruiz-Morales, D. Marrero-López, J. T. S. Irvine, and P. Núñez, *Mater. Res. Bull.*, 39, 1299-1318 (2004).
28. J. Huang, Z. Li, B. Y. Liaw, and J. Zhang, *J. Power Sources*, 309, 82-98 (2016).
29. P. Khullar and J. L. Gilbert, NACE Corrosion: Research in Progress Symposium (2019).

What is claimed is:

1. A method for determining frequency-dependent electrode impedance response from Electrochemical Impedance Spectroscopy (EIS) data, comprising:
   obtaining electrochemical impedance spectroscopy data for expected upper frequency data ranges associated with an electrode, with said data including both phase angle and impedance data;
   determining the Log of the frequency data;
   plotting the phase angle data versus the Log of the frequency data;
   determining a crossover point frequency for the plotted data; and
   producing a mirror symmetrical plot of data below the crossover point frequency to mirror the plotted data above the crossover point frequency, whereby a complete frequency-dependent response profile from low frequency to high frequency is obtained based on only upper frequency data.

2. A method as in claim 1, wherein determining a crossover frequency includes determining the Log of the crossover frequency, $Log\omega_x$, as an average of lower and upper frequency peak frequencies on the plotted Log scale.

3. A method as in claim 1, wherein the expected upper frequency data range encompasses at least close to the expected crossover frequency.

4. A method as in claim 1, wherein said EIS data is taken for a biomedical alloy electrode, made from at least one of CoCrMo alloy, Ti alloy, stainless steel alloy, or magnesium alloy.

5. A method as in claim 1, wherein said EIS data is measured for less than one minute of time and for only frequencies above 1 Hz.

6. A method for detection and determination of impedance characteristics for circuits, comprising:
   obtaining impedance and phase angle frequency data for a subject an electrochemical impedance circuit to be analyzed;
   plotting the derivative of the phase angle data with respect to the Log of the frequency;
   determining a crossover point frequency $\omega_x$;
   determining a full frequency range response plot using a symmetrical mirror of upper frequency data below the crossover point frequency, such that only upper frequency data is needed to determine full frequency range plotting; and
   using determined response plot data to determine circuit elements of a selected model circuit for the subject electrochemical impedance circuit being analyzed.

7. A method as in claim 6, wherein said impedance and phase angle frequency data is measured for less than one minute of time and for only frequencies above 1 Hz.

8. A method as in claim 6, wherein the selected model circuit comprises one of simple R-C circuits, Randles circuits, Constant Phase Element (CPE)-Randles circuits, and coating model circuits.

9. A method as in claim 8, wherein a Randles Circuit analysis is used, for which impedance equations are:

$$Z = Z' + iZ'' = R_s + R_p\left(\frac{1 - i\omega\tau}{1 + (\omega\tau)^2}\right)$$

where $i=\sqrt{-1}$, $\tau=R_pC$, and $R_s$ is the solution resistance, C is the capacitance and $R_p$ is the electrode polarization resistance;

$$|Z| = (Z'^2 + Z''^2)^{1/2}$$

and $$\theta = \tan^{-1}\left[\frac{Z''}{Z'}\right]$$

where θ is the phase angle of the Impedance.

10. A method as in claim 9, wherein the crossover point frequency $$\omega_x = \sqrt{\frac{1}{\tau_1}\frac{1}{\tau_2}},$$

where $\tau_1$ is the time constant (or reciprocal of the peak frequency) for the higher frequency peak and $\tau_1 = R_s C$, while $\tau_2$ is the time constant for the lower frequency peak and $\tau_2 = R_p C$, for when $R_p > R_s + 100\ \Omega$.

11. A method as in claim 8, wherein a Constant Phase Element (CPE) Randles Circuit analysis is used, to represent electrode behaviors under corrosion circumstances, and which includes a parallel combination of a resistor representing polarization resistance of the electrode surface, and a capacitor-like circuit element comprising a Constant Phase Element, all placed in series with a solution resistance representing an electrolyte's ionic conductivity.

12. A method as in claim 11, wherein said impedance and phase angle frequency data is measured for less than one minute of time and for only frequencies between 20,000 Hz and 2.5 Hz.

13. A system for determining frequency-dependent electrode impedance response of an electrode, comprising:
    a sensor for obtaining Electrochemical Impedance Spectroscopy (EIS) data for expected upper frequency data ranges associated with an electrode, with said data including both phase angle and impedance data;
    memory for storing said EIS data; and
    a processor, operatively associated with said memory for:
        determining the Log of said EIS data;
        plotting the phase angle data versus the Log of said EIS data;
        determining a crossover point frequency for the plotted data; and
        producing a mirror symmetrical plot of data below the crossover point frequency to mirror the plotted data above the crossover point frequency, whereby a complete frequency-dependent response profile from low frequency to high frequency is obtained based on only upper frequency data.

14. A system as in claim 13, wherein said processor is operative for determining said crossover frequency by determining the Log of the crossover frequency, $Log\omega_x$, as an average of lower and upper frequency peak frequencies on the plotted Log scale, as well as the upper frequency peak response.

15. A system as in claim 13, wherein the expected upper frequency data range encompasses at least close to the expected crossover frequency.

16. A system as in claim 13, wherein said electrode is a biomedical alloy electrode, made from at least one of CoCrMo alloy, Ti alloy, stainless steel alloy, or magnesium alloy.

17. A system as in claim 13, wherein said EIS data is measured for less than one minute of time and for only frequencies above 1 Hz.

18. A method for determining frequency-dependent electrode impedance response from Electrochemical Impedance Spectroscopy (EIS) data, comprising:
    obtaining electrochemical impedance spectroscopy data for expected upper frequency data ranges associated with an electrode, with said data including both phase angle and impedance data;
    determining the highest frequency impedance;
    determining the derivative of the phase angle with respect to the log of the frequency (phase derivative) over the range of frequencies obtained;
    determining as the high frequency characteristic frequency ($\omega_1$) the frequency (1) where the phase derivative is a maximum, or (2) where there is a maximum in the loss admittance;
    determining the amplitude of the phase derivative at the maximum frequency $\omega_1$;
    determining the frequency where the phase derivative crosses zero ($\omega_x$) or determining the frequency where the tangent of the phase angle is a maximum;
    finding the low frequency characteristic frequency ($\omega_2$) from the high frequency and crossover frequencies;
    determining all of the circuit parameters from the above values; and
    producing a mirror symmetrical plot of data below the crossover point frequency to mirror the plotted data above the crossover point frequency, whereby a more complete extended frequency-dependent response profile from low frequency to high frequency is obtained based on only upper frequency data.

19. A method as in claim 18, wherein determining a crossover frequency includes determining the Log of the crossover frequency, $Log\omega_x$, as an average of lower and upper frequency peak frequencies on the plotted Log scale.

20. A method as in claim 18, wherein the expected upper frequency data range encompasses at least close to the expected crossover frequency and the high frequency characteristic frequency, w1.

21. A method as in claim 18, wherein said EIS data is measured for less than one minute of time and for only frequencies above 1 Hz.

22. A method as in claim 18, wherein said EIS data is taken for a biomedical alloy electrode.

23. A method as in claim 22, wherein said biomedical alloy electrode is made from at least one of CoCrMo alloy, Ti alloy, stainless steel alloy, or magnesium alloy.

* * * * *